United States Patent
Maamari et al.

(10) Patent No.: US 12,323,972 B2
(45) Date of Patent: Jun. 3, 2025

(54) FREQUENCY RESOURCE SELECTION FOR MULTIPLE CHANNELS

(71) Applicant: QUALCOMM Incorporated, San Diego, CA (US)

(72) Inventors: Diana Maamari, San Diego, CA (US); Ahmed Elshafie, San Diego, CA (US); Huilin Xu, Temecula, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 17/877,162

(22) Filed: Jul. 29, 2022

(65) Prior Publication Data
US 2024/0040561 A1 Feb. 1, 2024

(51) Int. Cl.
*H04W 72/1268* (2023.01)
*H04W 72/0453* (2023.01)

(52) U.S. Cl.
CPC ... *H04W 72/1268* (2013.01); *H04W 72/0453* (2013.01)

(58) Field of Classification Search
CPC ......... H04W 72/1268; H04W 72/0453; H04W 72/232
See application file for complete search history.

(56) References Cited

U.S. PATENT DOCUMENTS

| | | | | |
|---|---|---|---|---|
| 11,910,381 B2 * | 2/2024 | Sakhnini | | H04W 72/23 |
| 2020/0068624 A1 * | 2/2020 | Xu | | H04W 28/02 |
| 2021/0259002 A1 * | 8/2021 | Hosseini | | H04W 72/0446 |
| 2021/0337574 A1 * | 10/2021 | Yang | | H04L 1/1896 |
| 2022/0078823 A1 * | 3/2022 | Li | | H04W 72/0446 |
| 2023/0328739 A1 * | 10/2023 | Li | | H04W 72/21 370/329 |
| 2025/0016752 A1 * | 1/2025 | Deghel | | H04L 5/0053 |

FOREIGN PATENT DOCUMENTS

WO WO-2021258264 A1 * 12/2021

* cited by examiner

*Primary Examiner* — Deepa Belur
(74) *Attorney, Agent, or Firm* — Holland & Hart LLP/Qualcomm Incorporated

(57) ABSTRACT

Methods, systems, and devices for wireless communication are described. In some systems, a network entity may transmit, to a user equipment (UE), scheduling information that allocates multiple uplink channels of a same channel type to the UE. The scheduling information may indicate respective sets of frequency resources for each of the uplink channels. The network entity may transmit an indication that uplink channel selection by the UE is enabled. The UE may select a first uplink channel from the multiple uplink channels allocated by the scheduling information based on the indication that uplink shared channel selection is enabled. The UE may transmit an uplink message via the first uplink channel, and the UE may refrain from transmitting via other uplink channels of the multiple uplink channels allocated by the scheduling information based on selecting the first uplink channel.

29 Claims, 20 Drawing Sheets

FREQUENCY RESOURCE SELECTION FOR MULTIPLE CHANNELS

FIELD OF TECHNOLOGY

The following relates to wireless communication, including frequency resource selection for multiple channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, a network entity may transmit scheduling information via a dynamic grant or one or more configured grants. The scheduling information may allocate channel resources for one or more uplink or downlink channels.

SUMMARY

The described techniques relate to improved methods, systems, devices, and apparatuses that support frequency resource selection for multiple channels. For example, the described techniques provide for a network to schedule multiple channels having different frequency resource allocations and for a user equipment (UE) to select at least one channel from among the multiple allocated channels. The UE may receive scheduling information that allocates the multiple channels having a same channel type. The channel type may be uplink, downlink, shared channel, control channel, or any combination thereof. In some aspects, the scheduling information may allocate a respective set of frequency sources within each of the multiple channels. Allocation of multiple sets of overlapping or non-overlapping frequency resources may improve communication reliability due to frequency diversity among the allocated resources, for example.

If the scheduling information allocates multiple uplink channels, the network entity may transmit an indication that uplink channel selection by the UE is enabled for the multiple uplink channels. In such cases, the UE may select at least a first uplink channel from among the multiple uplink channels allocated via the scheduling information. The first uplink channel may be associated with or may include a first set of frequency resources. The UE may transmit an uplink message and an indication of the selection via the first uplink channel based on the selection. The UE may refrain from transmitting via at least a portion of one or more other uplink channels of the set of multiple uplink channels allocated via the scheduling information based on the selection. The UE may thereby refrain from transmitting excessive information if uplink channel resources are overallocated, which may reduce processing, power consumption, and overhead.

A method for wireless communication at a UE is described. The method may include receiving scheduling information that allocates a set of multiple uplink channels of a same channel type to the UE, where the scheduling information indicates respective sets of frequency resources for the set of multiple uplink channels, selecting, from among the set of multiple uplink channels, a first uplink channel that includes a first set of frequency resources, transmitting an uplink message via the first uplink channel based on the selecting, and refraining from transmitting via at least a portion of a second uplink channel of the set of multiple uplink channels based on the selecting, the second uplink channel including a second set of frequency resources.

An apparatus for wireless communication is described. The apparatus may include a memory, a transceiver, and at least one processor of a UE, the at least one processor coupled with the memory and the transceiver. The at least one processor may be configured to receive scheduling information that allocates a set of multiple uplink channels of a same channel type to the UE, where the scheduling information indicates respective sets of frequency resources for the set of multiple uplink channels, select, from among the set of multiple uplink channels, a first uplink channel that includes a first set of frequency resources, transmit an uplink message via the first uplink channel based on the selecting, and refrain from transmitting via at least a portion of a second uplink channel of the set of multiple uplink channels based on the selecting, the second uplink channel including a second set of frequency resources.

Another apparatus for wireless communication at a UE is described. The apparatus may include means for receiving scheduling information that allocates a set of multiple uplink channels of a same channel type to the UE, where the scheduling information indicates respective sets of frequency resources for the set of multiple uplink channels, means for selecting, from among the set of multiple uplink channels, a first uplink channel that includes a first set of frequency resources, means for transmitting an uplink message via the first uplink channel based on the selecting, and means for refraining from transmitting via at least a portion of a second uplink channel of the set of multiple uplink channels based on the selecting, the second uplink channel including a second set of frequency resources.

A non-transitory computer-readable medium storing code for wireless communication at a UE is described. The code may include instructions executable by a processor to receive scheduling information that allocates a set of multiple uplink channels of a same channel type to the UE, where the scheduling information indicates respective sets of frequency resources for the set of multiple uplink channels, select, from among the set of multiple uplink channels, a first uplink channel that includes a first set of frequency resources, transmit an uplink message via the first uplink channel based on the selecting, and refrain from transmitting via at least a portion of a second uplink channel of the set of multiple uplink channels based on the selecting, the second uplink channel including a second set of frequency resources.

In some examples of the method, apparatuses, and non-transitory computer-readable medium described herein, receiving the scheduling information may include operations, features, means, or instructions for receiving, via the scheduling information, an indication that uplink channel selection by the UE may be enabled for the set of multiple uplink channels, where the UE selecting the first uplink channel may be based on the indication that uplink channel selection is enabled.

In some examples of the method, apparatuses, and non-transitory computer-readable medium described herein, the scheduling information includes a downlink control information (DCI) message and the indication that uplink channel selection by the UE is enabled for the set of multiple uplink channels may include a format of the DCI message.

In some examples of the method, apparatuses, and non-transitory computer-readable medium described herein, the set of multiple uplink channels may be at least partially overlapping in a frequency domain and the method, apparatuses, and non-transitory computer-readable medium may include further operations, features, means, or instructions for transmitting, within a subset of the first set of frequency resources that may be common to the set of multiple uplink channels, uplink control information (UCI) that indicates that the UE may have selected the first uplink channel from among the set of multiple uplink channels.

Some examples of the method, apparatuses, and non-transitory computer-readable medium described herein may further include operations, features, means, or instructions for selecting a second subset of the first set of frequency resources for transmitting the uplink message, where the uplink message may be transmitted within the second subset of the first set of frequency resources, and where the UCI further indicates that the UE may have selected the second subset for transmitting the uplink message.

Some examples of the method, apparatuses, and non-transitory computer-readable medium described herein may further include operations, features, means, or instructions for receiving, via the scheduling information or a control message that may be different than the scheduling information, an indication of the subset of the first set of frequency resources that may be common to the set of multiple uplink channels.

In some examples of the method, apparatuses, and non-transitory computer-readable medium described herein, the set of multiple uplink channels may be at least partially overlapping in a frequency domain and the method, apparatuses, and non-transitory computer-readable medium may include further operations, features, means, or instructions for transmitting, via a subset of the first set of frequency resources, a demodulation reference signal (DMRS) sequence that indicates that the UE has selected the first uplink channel from among the set of multiple uplink channels, where the subset of the first set of frequency resources may be common to the set of multiple uplink channels.

In some examples of the method, apparatuses, and non-transitory computer-readable medium described herein, each of the set of multiple uplink channels includes a respective set of reserved resources for UCI and the method, apparatuses, and non-transitory computer-readable medium may include further operations, features, means, or instructions for transmitting, via the respective set of reserved resources within the first uplink channel, UCI that indicates that the UE may have selected the first uplink channel from among the set of multiple uplink channels.

In some examples of the method, apparatuses, and non-transitory computer-readable medium described herein, each of the set of multiple uplink channels may be associated with a respective DMRS sequence and the method, apparatuses, and non-transitory computer-readable medium may include further operations, features, means, or instructions for transmitting, via a portion of the first uplink channel, the respective DMRS sequence for the first uplink channel to indicate that the UE has selected the first uplink channel from among the set of multiple uplink channels.

In some examples of the method, apparatuses, and non-transitory computer-readable medium described herein, receiving the scheduling information may include operations, features, means, or instructions for receiving, within the scheduling information, a set of multiple frequency domain resource allocation (FDRA) fields that each allocate a respective uplink channel of the set of multiple uplink channels.

Some examples of the method, apparatuses, and non-transitory computer-readable medium described herein may further include operations, features, means, or instructions for receiving a control message that indicates a set of multiple sets of frequency resources, where an FDRA field within the scheduling information indicates a subset of the set of multiple sets of frequency resources, the subset including the respective sets of frequency resources for the set of multiple uplink channels.

In some examples of the method, apparatuses, and non-transitory computer-readable medium described herein, receiving the scheduling information may include operations, features, means, or instructions for receiving a DCI message that allocates the set of multiple uplink channels to the UE and indicates the respective sets of frequency resources for the set of multiple uplink channels.

In some examples of the method, apparatuses, and non-transitory computer-readable medium described herein, receiving the scheduling information may include operations, features, means, or instructions for receiving at least one configured grant that allocates the set of multiple uplink channels to the UE and indicates the respective sets of frequency resources for the set of multiple uplink channels.

In some examples of the method, apparatuses, and non-transitory computer-readable medium described herein, the set of multiple uplink channels allocated to the UE may be overlapping in a time domain and the set of multiple uplink channels allocated to the UE may be partially overlapping or non-overlapping in a frequency domain.

A method for wireless communication at a network entity is described. The method may include transmitting scheduling information that allocates a set of multiple uplink channels of a same channel type to a UE, where the scheduling information indicates respective sets of frequency resources for the set of multiple uplink channels, transmitting an indication that uplink channel selection by the UE is enabled for the set of multiple uplink channels, and receiving an uplink message via a first uplink channel based on identifying that the UE has selected the first uplink channel from among the set of multiple uplink channels, where the first uplink channel includes a first set of frequency resources.

An apparatus for wireless communication is described. The apparatus may include a memory and at least one processor of a network entity, the at least one processor coupled with the memory. The at least one processor may be configured to transmit scheduling information that allocates a set of multiple uplink channels of a same channel type to a UE, where the scheduling information indicates respective sets of frequency resources for the set of multiple uplink channels, transmit an indication that uplink channel selection by the UE is enabled for the set of multiple uplink channels, and receive an uplink message via a first uplink channel based on identifying that the UE has selected the first uplink channel from among the set of multiple uplink channels, where the first uplink channel includes a first set of frequency resources.

Another apparatus for wireless communication at a network entity is described. The apparatus may include means for transmitting scheduling information that allocates a set of multiple uplink channels of a same channel type to a UE, where the scheduling information indicates respective sets of frequency resources for the set of multiple uplink channels, means for transmitting an indication that uplink channel selection by the UE is enabled for the set of multiple uplink channels, and means for receiving an uplink message via a first uplink channel based on identifying that the UE has selected the first uplink channel from among the set of multiple uplink channels, where the first uplink channel includes a first set of frequency resources.

A non-transitory computer-readable medium storing code for wireless communication at a network entity is described. The code may include instructions executable by a processor to transmit scheduling information that allocates a set of multiple uplink channels of a same channel type to a UE, where the scheduling information indicates respective sets of frequency resources for the set of multiple uplink channels, transmit an indication that uplink channel selection by the UE is enabled for the set of multiple uplink channels, and receive an uplink message via a first uplink channel based on identifying that the UE has selected the first uplink channel from among the set of multiple uplink channels, where the first uplink channel includes a first set of frequency resources.

In some examples of the method, apparatuses, and non-transitory computer-readable medium described herein, transmitting the scheduling information may include operations, features, means, or instructions for transmitting, within the scheduling information, the indication that uplink channel selection by the UE may be enabled for the set of multiple uplink channels.

In some examples of the method, apparatuses, and non-transitory computer-readable medium described herein, the set of multiple uplink channels may be at least partially overlapping in a frequency domain and the method, apparatuses, and non-transitory computer-readable medium may include further operations, features, means, or instructions for transmitting, via the scheduling information or a control message that may be different than the scheduling information, an indication of a subset of the first set of frequency resources that may be common to the set of multiple uplink channels and receiving, via the subset of the first set of frequency resources, an indication that the UE may have selected, from among the set of multiple uplink channels, at least a portion of the first set of frequency resources in the first uplink channel for transmitting the uplink message, where identifying that the UE selected the first uplink channel may be based on receiving the indication.

In some examples of the method, apparatuses, and non-transitory computer-readable medium described herein, each of the set of multiple uplink channels includes a respective set of reserved resources for UCI and the method, apparatuses, and non-transitory computer-readable medium may include further operations, features, means, or instructions for receiving, via the respective set of reserved resources within the first uplink channel, UCI that indicates that the UE selected the first uplink channel from among the set of multiple uplink channels, where identifying that the UE may have selected the first uplink channel may be based on receiving the indication.

In some examples of the method, apparatuses, and non-transitory computer-readable medium described herein, each of the set of multiple uplink channels may be associated with a respective DMRS sequence and the method, apparatuses, and non-transitory computer-readable medium may include further operations, features, means, or instructions for receiving, via a portion of the first uplink channel, the respective DMRS sequence for the first uplink channel, where identifying that the UE selected the first uplink channel may be based on receiving the respective DMRS sequence for the first uplink channel.

In some examples of the method, apparatuses, and non-transitory computer-readable medium described herein, transmitting the scheduling information may include operations, features, means, or instructions for transmitting, within the scheduling information, a set of multiple FDRA fields that each allocate a respective uplink channel of the set of multiple uplink channels.

Some examples of the method, apparatuses, and non-transitory computer-readable medium described herein may further include operations, features, means, or instructions for transmitting a control message that indicates a set of multiple sets of frequency resources, where a FDRA field within the scheduling information indicates a subset of the set of multiple sets of frequency resources, the subset including the respective sets of frequency resources for the set of multiple uplink channels.

In some examples of the method, apparatuses, and non-transitory computer-readable medium described herein, transmitting the scheduling information may include operations, features, means, or instructions for transmitting a DCI message or at least one configured grant that allocates the set of multiple uplink channels to the UE and indicates the respective sets of frequency resources for the set of multiple uplink channels.

In some examples of the method, apparatuses, and non-transitory computer-readable medium described herein, no signaling may be received from the UE within at least a portion of a second uplink channel of the set of multiple uplink channels, the second uplink channel including a second set of frequency resources set.

In some examples of the method, apparatuses, and non-transitory computer-readable medium described herein, the set of multiple uplink channels allocated to the UE may be overlapping in a time domain and the set of multiple uplink channels allocated to the UE may be partially overlapping or non-overlapping in a frequency domain.

DETAILED DESCRIPTION

Figure 1:
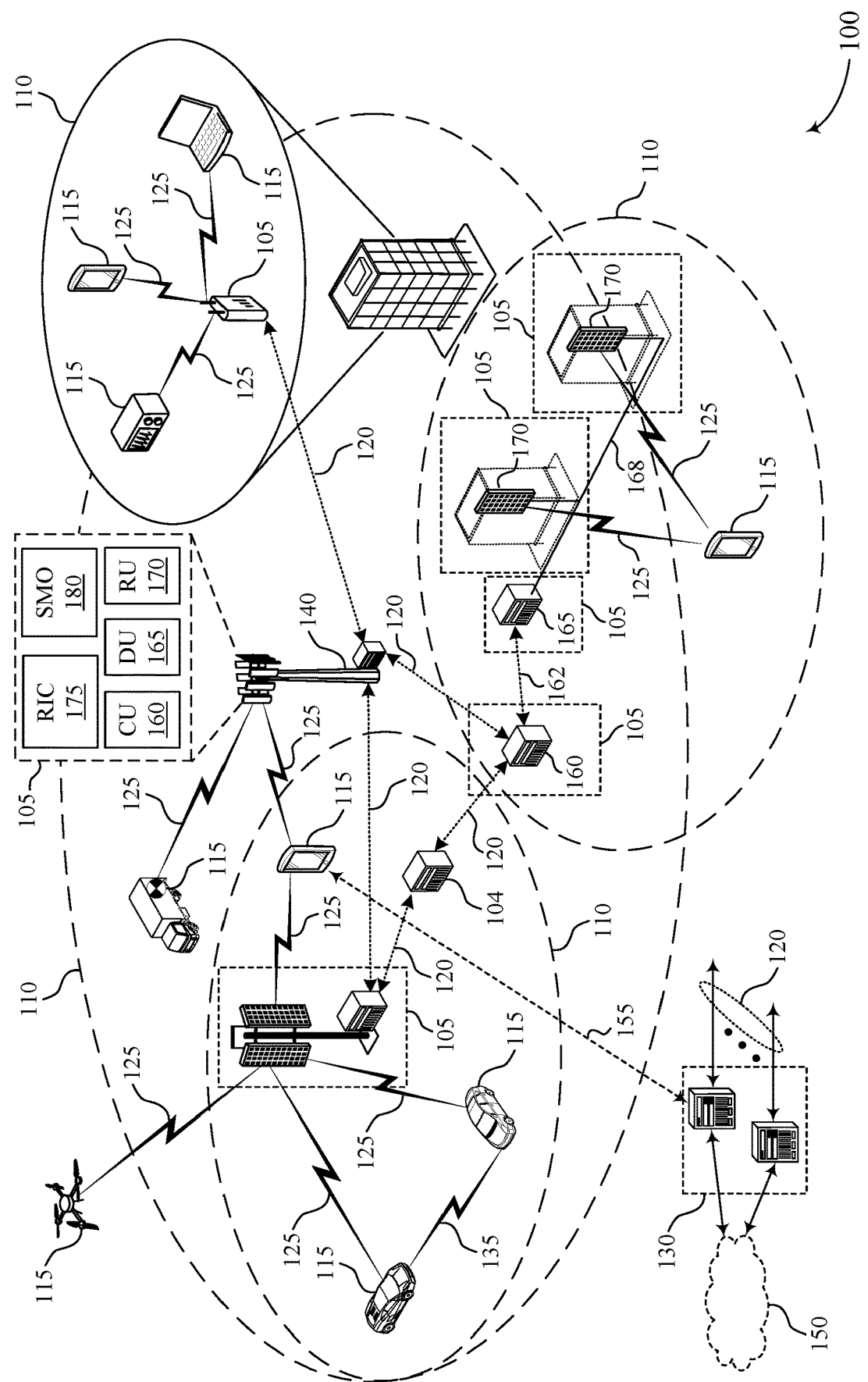
FIG. 1 illustrates an example of a wireless communications system that supports frequency resource selection for multiple channels in accordance with one or more aspects of the present disclosure.

In some wireless communications systems, a network entity may transmit scheduling information that allocates multiple uplink or downlink channels of a same channel type (e.g., multiple physical uplink shared channels (PUSCHs), multiple physical downlink shared channels (PDSCHs), or multiple channels of some other type of channel. Each uplink or downlink channel may include or correspond to a set of channel resources that may be overlapping or non-overlapping in a time domain. For example, where multiple PUSCHs are allocated, the multiple PUSCHs may respectively correspond to multiple sets of PUSCH resources, with each allocated set of PUSCH resources referred to as an allocated PUSCH. As another example, where multiple PDSCHs are allocated, the multiple PDSCHs may respectively correspond to multiple sets of PDSCH resources, with each allocated set of PDSCH resources referred to as an allocated PDSCH. Thus, an allocated uplink channel may refer to an allocated set of uplink channel resources, and an allocated downlink channel may refer to an allocated set of downlink channel resources.

The scheduling information that allocates multiple uplink or downlink channels of a same channel type may be transmitted via a dynamic grant (e.g., via downlink control information (DCI)) or via one or more configured grants. The scheduling information may include a frequency domain resource allocation (FDRA) field and a time domain resource allocation (TDRA) field for allocating the channel resources in the frequency domain and the time domain, respectively. In some cases, however, an FDRA field in a dynamic grant (e.g., DCI) may not support allocating different frequency resources to different uplink or downlink channels, which may reduce reliability of the scheduled communications due to lack of frequency diversity among the allocated resources, for example.

In some aspects, a user equipment (UE) may transmit a request for resources for transmissions by the UE, and a network entity may transmit scheduling information that allocates uplink channels for the UE based on the request. In some other aspects, the network entity may preschedule resources for transmissions by the UE without receiving a request from the UE, which may result in an overallocation of resources (e.g., as the network entity may allocate the resources without knowledge of how much uplink information may be in a buffer of the UE). In some systems, the UE may transmit within each set of resources allocated by the scheduling information even if the resources are overallocated (e.g., the amount of data in the buffer at the UE can be transmitted in fewer than all of the allocated resources), which may cause unnecessary signaling overhead and power consumption by the UE.

Techniques, systems, and devices described herein support allocation of multiple uplink or downlink channels having different frequency resource allocations (e.g., sets of resources that are non-overlapping or partially overlapping in a frequency domain). For example, a network entity may transmit scheduling information (e.g., a single DCI message, or one or more configured grants) to a UE that allocates multiple sets of uplink or downlink channel resources each associated with different frequency resource allocations. In some aspects, a single scheduling grant may include one or more FDRA fields configured to allocate multiple sets of frequency resources that are non-overlapping or partially overlapping in the frequency domain. The different frequency resource allocations may improve frequency diversity of transmissions, among other examples.

Additionally, or alternatively, techniques described herein support selection, by a UE and from among multiple uplink channels allocated by scheduling information, of at least a portion of an allocated uplink channel to utilize for uplink communications. For example, each uplink channel may be allocated a set of uplink channel resources, and the UE may select one or more of the sets of uplink channel resources, a subset of uplink channel resources from one or more of the sets, or both. The UE may refrain from transmitting within the uplink channel resources that were allocated by the scheduling information but not selected by the UE, which may reduce overhead and power consumption at the UE, among other examples. The UE may indicate the selected uplink channel resources to a network entity. In some aspects, the uplink channels allocated by the scheduling information may be at least partially overlapping in a time domain, a frequency domain, or both, and the overlapping portions may include resources common to each of the resource sets. The UE may transmit uplink control information (UCI) or a demodulation reference signal (DMRS) sequence via the common resources to indicate which set or subset of uplink channel resources the UE selected. Additionally, or alternatively, each uplink channel may include a respective set of reserved resources, and the UE may transmit UCI or a DMRS via the reserved resources of a given uplink channel to indicate that the UE selected that uplink channel.

Aspects of the disclosure are initially described in the context of wireless communications systems. Additional aspects are described with reference to channel configuration schemes, uplink channel configurations, and process flows. Aspects of the disclosure are further illustrated by and described with reference to apparatus diagrams, system diagrams, and flowcharts that relate to frequency resource selection for multiple channels.

FIG. 1 illustrates an example of a wireless communications system 100 that supports frequency resource selection for multiple channels in accordance with one or more aspects of the present disclosure. The wireless communications system 100 may include one or more network entities 105, one or more UEs 115, and a core network 130. In some examples, the wireless communications system 100 may be a Long-Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and the one or more DUs 165 or RUs 170 may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or IAB node 104 may be referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support frequency resource selection for multiple channels as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support frequency resource selection for multiple channels. For example, a network entity 105 may schedule multiple channels having different frequency resource allocations and a UE may select at least one channel from among the multiple allocated channels. The UE 115 may receive scheduling information that allocates the multiple channels having a same channel type. The channel type may be uplink, downlink, shared channel, control channel, or any combination thereof. Allocation of a channel may include allocation of a set of channel resources. In some aspects, the scheduling information may allocate a respective set of frequency sources for each of the multiple channels. Allocation of multiple sets of overlapping or non-overlapping frequency resources may improve communication reliability due to frequency diversity among the allocated resources, for example.

If the scheduling information allocates multiple uplink channels, the network entity 105 may transmit an indication that uplink channel selection by the UE 115 is enabled for the multiple uplink channels. In such cases, the UE 115 may select at least a first uplink channel from among the multiple uplink channels allocated via the scheduling information. The first uplink channel may be associated with or may include a first set of frequency resources. The UE 115 may transmit an uplink message and an indication of the selection via the first uplink channel based on the selection. The UE 115 may refrain from transmitting via at least a portion of one or more other uplink channels of the set of multiple uplink channels allocated via the scheduling information based on the selection. The UE 115 may thereby refrain from transmitting excessive information if uplink channel resources are overallocated, which may reduce processing, power consumption, and overhead.

Figure 2:
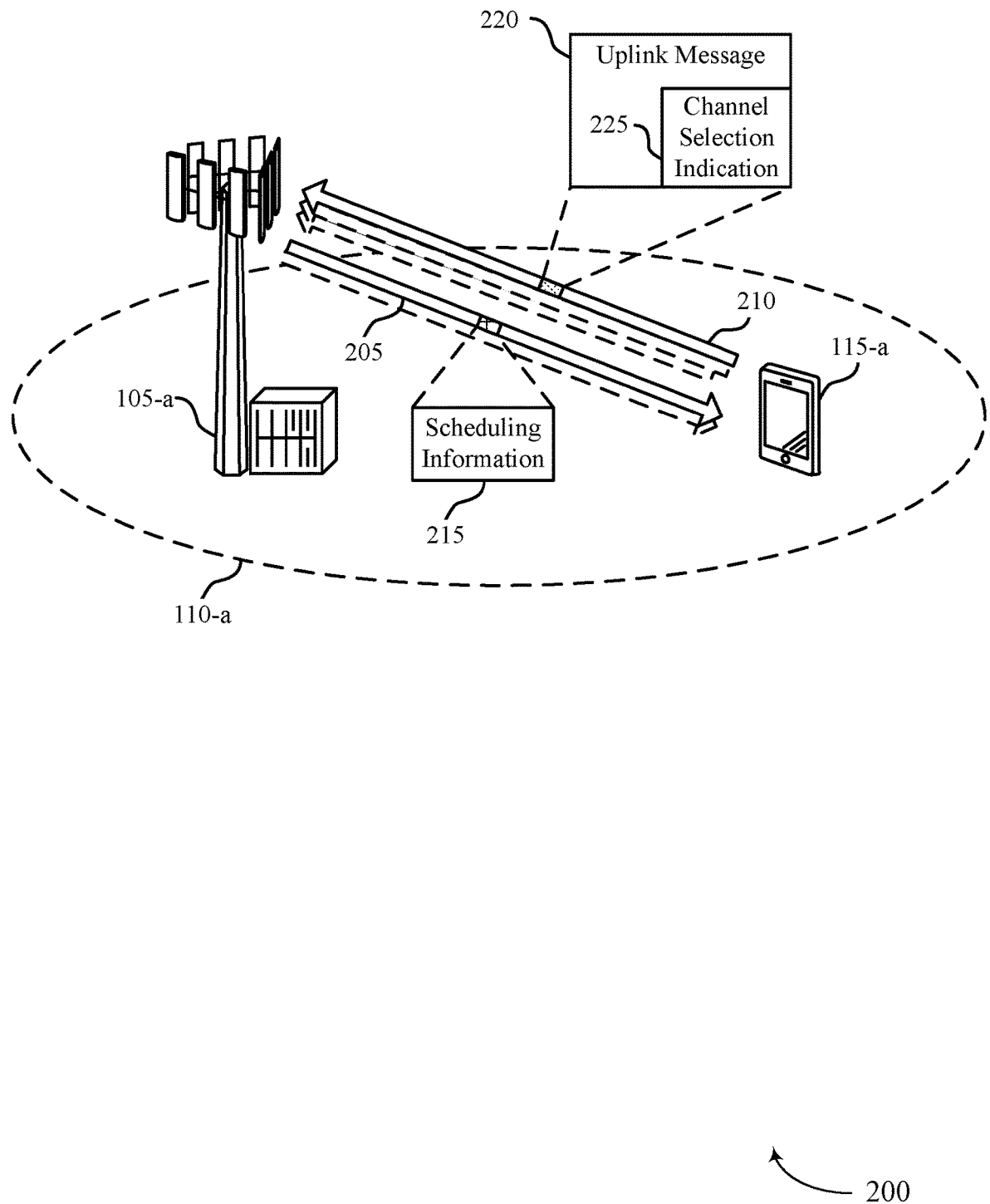
FIG. 2 illustrates an example of a wireless communications system that supports frequency resource selection for multiple channels in accordance with one or more aspects of the present disclosure.

FIG. 2 illustrates an example of a wireless communications system 200 that supports frequency resource selection for multiple channels in accordance with one or more aspects of the present disclosure. The wireless communications system 200 may implement or be implemented by aspects of the wireless communications system 100. For example, the wireless communications system 200 illustrates communications between a UE 115-a and a network entity 105-a, which may represent examples of corresponding devices as described with reference to FIG. 1.

The network entity 105-a may communicate with the UE 115-a within a geographic coverage area 110-a and via one or more downlink communication links 205 and one or more uplink communication links 210. The network entity 105-a may transmit scheduling information 215 to schedule resources for uplink transmissions by the UE 115-a via an uplink communication link 210, downlink transmissions to the UE 115-a via a downlink communication link 205, or both. The scheduling information 215 may be transmitted via a dynamic grant (e.g., a DCI), one or more configured grants, or both.

In some aspects, communications between the UE 115-a and the network entity 105-a may follow a somewhat regular or periodic pattern, and may occur relatively frequently (e.g., extended reality (XR) communications). For example, the UE 115-a, the network entity 105-a, or both may support one or more applications (e.g., cloud gaming applications, XR applications, virtual reality (VR) split rendering applications, augmented reality (AR) split computation applications, some other applications, or any combination thereof) that may be associated with relatively frequent (e.g., low latency) uplink or downlink traffic that has a regular or periodic pattern. In some aspects, the traffic, such as uplink video traffic, may include bursts of data packets. A burst may correspond to a relatively large quantity of data packets being transmitted within a relatively short period of time (e.g., a set of packets generated by one or more applications at roughly the same time).

The network entity 105-a may support such bursts of uplink or downlink data by allocating, via the scheduling information 215 (e.g., a single DCI), multiple uplink or downlink channels of a same channel type (e.g., multi-PUSCH transmissions or multi-PDSCH transmissions). The channel type may correspond to a PUSCH, a PDSCH, a physical uplink control channel (PUCCH), a physical downlink control channel (PDCCH), some other type of uplink or downlink channel, or any combination thereof. In some aspects, allocation of an uplink channel or a downlink channel may correspond to allocation of a set of channel resources in time and frequency domains. For example, allocation of two PUSCHs may correspond to an allocation of a first set of PUSCH resources and a second set of PUSCH resources. The first and second sets of PUSCH resources may be overlapping or non-overlapping in the time domain and the frequency domain. The multiple channels may be allocated within a same downlink communication link 205 or uplink communication link 210, or within different communication links (e.g., as illustrated by the dashed arrows in FIG. 2).

The network entity 105-a may schedule the multiple uplink or downlink channels across multiple slots, multiple cells, or both. For example, the network entity 105-a may transmit scheduling information 215 via one or more grants to allocate resources for transmitting multiple transport blocks (TBs) in different slots in uplink and/or downlink directions. The multiple uplink or downlink channels may be configured with a same modulation and coding scheme (MCS) or bandwidth for all the scheduled TBs. The grant may include a TDRA field that supports allocation of multiple sets of time resources that are non-overlapping or partially overlapping in the time domain. Each allocated uplink or downlink channel may thereby be configured with a different starting position or slot. In some cases, however, if the scheduling information 215 is transmitted via a single grant (e.g., for dynamic grants), a frequency allocation for each of the scheduled channels may be the same. For example, an FDRA field in the grant may not support allocation of different frequency resources, which may reduce reliability of the scheduled transmissions due to lack of frequency diversity among the allocated channel resources, for example.

Techniques, systems, and devices described herein provide for the network entity 105-a to schedule multiple channels having different frequency resource allocations using one or more configured grants, a dynamic grant, or both. For example, an FDRA field in the dynamic grant may be added or updated to support multiple frequency resource allocations. Techniques for allocating multiple different sets of frequency resources via a single grant are described in further detail elsewhere herein, including with reference to FIG. 3.

In some cases, the UE 115-a may transmit a scheduling request, a buffer status report (BSR), or both to the network entity 105-a to request resources for an uplink transmission. The network entity 105-a may transmit the scheduling information 215 that allocates uplink channel resources for the UE 115-a based on the scheduling request, the BSR, or both. In some cases, however, transmission of the scheduling information and BSR may increase a round-trip-time for communications, which may increase latency. As such, the network entity 105-a may, in some aspects, preschedule uplink channels for the UE 115-a (e.g., in anticipation of new uplink data and without receiving a request from the UE 115-a).

If the network entity 105-a preschedules uplink channels, the network entity 105-a may over-allocate uplink resources for the UE 115-a (e.g., as the network entity 105-a may allocate the resources without knowledge of how much uplink information is in a buffer at the UE 115-a). Additionally, or alternatively, the network entity 105-a may over-allocate uplink resources due to quantization errors or relatively low resolution associated with a BSR from the UE 115-a (e.g., the uplink grants may not match the data at the UE 115-a). In such cases, the network entity 105-a may allocate multiple sets of uplink resources for a single transmission, and the UE 115-a may be able to transmit all the information in the buffer of the UE 115-a in fewer than all of the allocated resources. In some cases, the UE 115-a may be configured to transmit in all of the allocated resources, regardless of a capacity of the buffer at the UE 115-a. For example, the UE 115-a may transmit zeroes or other filler information to fill all of the allocated resources, which may increase overhead and power consumption by the UE 115-a.

Techniques described herein provide for the UE 115-a to select a subset of the uplink channel resources allocated via the scheduling information 215 and to indicate the selection to the network entity 105-a. The UE 115-a may refrain from transmitting via remaining uplink channel resources that were allocated via the scheduling information 215 but not selected by the UE 115-a, which may reduce power compensation and overhead. In some aspects, the UE 115-a may receive an indication that uplink channel selection is enabled. The indication may be transmitted via the scheduling information 215 (e.g., DCI) or a control message that is different than the scheduling information 215 (e.g., an RRC message, a medium access control-control element (MAC-CE), DCI, or some other control message). The indication may be a bit that, when set to a certain value, signals that the UE 115-a may choose one or a subset of the multiple uplink channels allocated via the scheduling information 215. Additionally, or alternatively, the scheduling information 215 may be transmitted via DCI and a format of the DCI may indicate that the uplink channel selection by the UE 115-a is enabled.

If uplink channel selection by the UE 115-a is enabled or configured, the UE 115-a may select one or more uplink channels, or a subset of resources within one or more uplink channels, from the scheduled uplink channels to use for transmitting an uplink message 220. The UE 115-a may select the uplink channels or the portions of uplink channels based on a quantity of data in a buffer at the UE 115-a (e.g., a size of the uplink message 220). To reduce blind detection by the network entity 105-a, the UE 115-a may transmit, via the selected uplink resources, a channel selection indication 225 to indicate the selected set of resources to the network entity 105-a. The channel selection indication 225 may be transmitted via UCI, a DMRS sequence, some other uplink message or reference signal, or any combination thereof. Techniques for indicating the uplink resource selection are described in further detail elsewhere herein, including with reference to FIGS. 4-6.

The UE 115-a may transmit the uplink message 220 via the selected set of uplink resources. The UE 115-a may refrain from transmitting the uplink message 220 or any other uplink message or signaling via the other uplink resources that were allocated via the scheduling information 215 but were not selected by the UE 115-a. Thus, the UE 115-a may refrain from transmitting extra information (e.g., null information) via overallocated resources, which may reduce power consumption and overhead. The UE 115-a and the network entity 105-a may thereby support communications via multiple uplink or downlink channels allocated by the same scheduling information 215 and having the same or different frequency resource allocations. By selecting one or more of the allocated channels, the UE 115-a may reduce power consumption and overhead.

Figure 3:
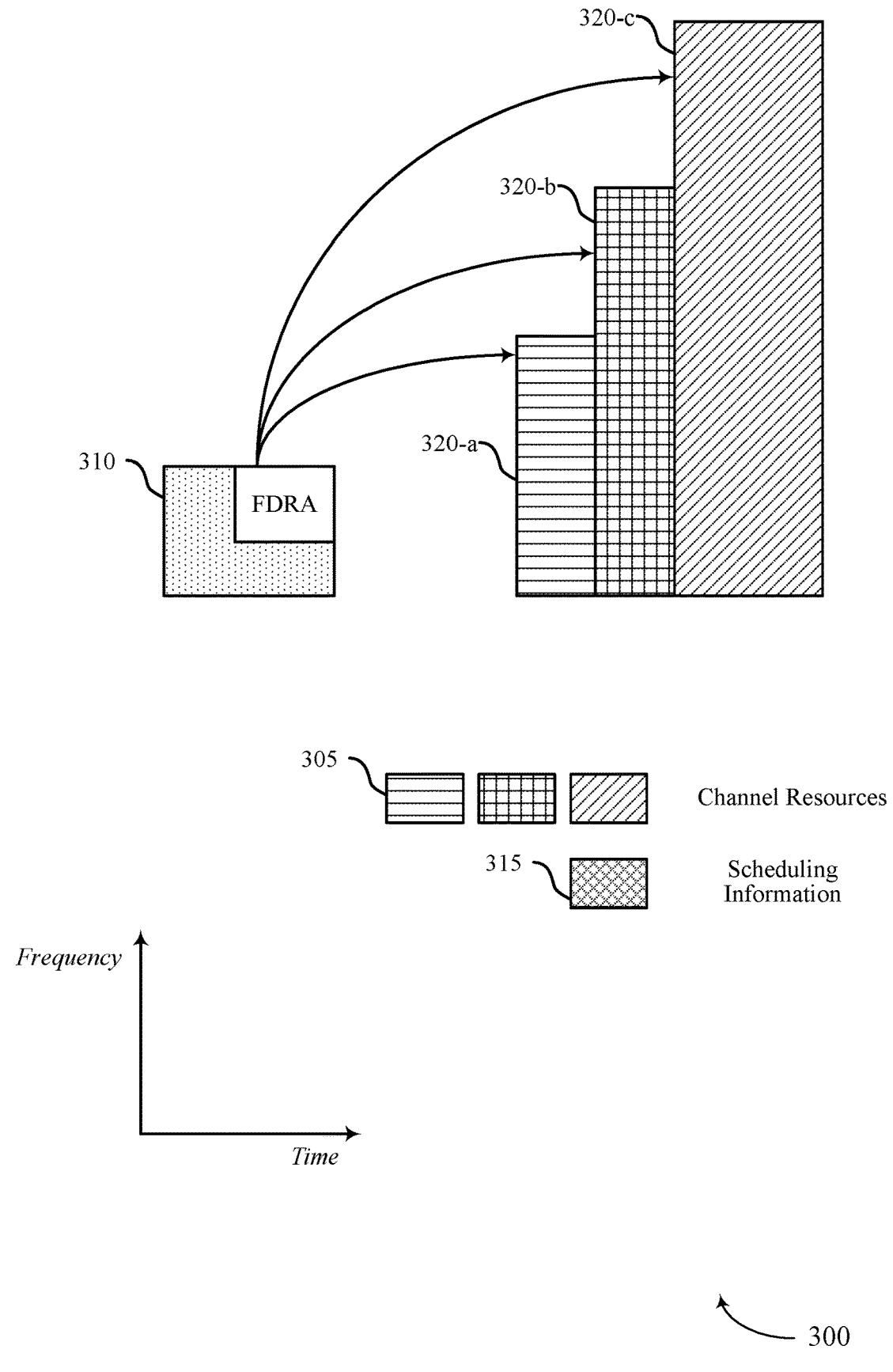
FIG. 3 illustrates an example of a channel configuration scheme that supports frequency resource selection for multiple channels in accordance with one or more aspects of the present disclosure.

FIG. 3 illustrates an example of a channel configuration scheme 300 that supports frequency resource selection for multiple channels in accordance with one or more aspects of the present disclosure. The channel configuration scheme 300 may implement or be implemented by aspects of the wireless communications systems 100 and 200 described with reference to FIGS. 1 and 2. For example, the channel configuration scheme 300 illustrates a configuration of multiple channels 320 for uplink or downlink communications between a UE 115 and a network entity 105, which may represent examples of corresponding devices as described with reference to FIGS. 1 and 2.

The network entity 105 may schedule or allocate multiple channels 320 each including a respective set of channel resources 305 for communications with the UE 115. The network entity 105 may indicate the scheduled channels 320 via scheduling information 315 in a dynamic grant (e.g., DCI) or one or more configured grants. The channels 320 may be uplink channels (e.g., a PUSCH), downlink channels (e.g., a PDSCH), or both. Allocation of a channel 320 as described herein may include allocation of a set of channel resources 305 in a time domain and a frequency domain, as illustrated in FIG. 2. For example, the channel 320-*a* may include a first set of channel resources 305 that is different than (e.g., partially but not fully overlapping with) a second set of channel resources 305 allocated for the channel 320-*b* and a third set of channel resources 305 allocated for the channel 320-*c*. In some aspects, the scheduling information 315 may schedule channels 320 of a same channel type. For example, the channels 320 may each be uplink shared channels or downlink shared channels.

The channels 320 scheduled by the scheduling information 315 may be overlapping, non-overlapping, or partially overlapping in a time domain. In some aspects, if the scheduling information 315 is transmitted via a single grant 310 (e.g., DCI), the grant 310 may schedule multiple starting positions for uplink or downlink transmissions in one or more slots. In the example of FIG. 3, the scheduling information 315 may schedule three potential starting positions for an uplink or downlink channel 320. The UE 115 may perform an LBT procedure for channel access, and the UE 115 may select one or more of the scheduled starting positions based on an outcome of the LBT procedure.

The grant 310 (e.g., DCI 1_0, or some other grant 310) may include a TDRA field that supports configuration or allocation of multiple channels 320 having different time domain allocations. For example, the network entity 105 may configure, via a higher layer parameter (e.g., pusch-TimeDomainAllocationListForMultiPUSCH or psuch-TimeDomainAllocationListDCI-0-1), one or more time domain allocations or starting positions, which may be referred to as entries. A quantity of bits in the TDRA field (e.g., between zero and six bits, or some other quantity of bits) may be based on a quantity of entries in the higher layer parameter. For example, a bit width of the FDRA field may be determined by $\lceil \log_2(I) \rceil$ bits, where I may represent a quantity of entries in the higher layer parameter. A value of the TDRA field may thereby indicate one or more of the entries (e.g., starting positions, time domain resource allocations) configured by the higher layer parameter.

In some cases, as described with reference to FIG. 2, the scheduling information 315 may be transmitted via multiple grants 310 (e.g., configured grants), and each grant 310 may include a respective frequency allocation for a respective channel 320. If, however, the scheduling information 315 is transmitted via a single grant 310, such as DCI, for example, the grant 310 may include one FDRA field.

Techniques described herein provide for configuring, via scheduling information 315 in a single grant 310, multiple channels 320 each associated with different frequency allocations. For example, an allocation of the channel resources 305 in a frequency domain (e.g., a resource block allocation) may be different in each of the channels 320-*a*, 320-*b*, and 320-*c*. Although the channel resources 305 in each of the channels 320-*a*, 320-*b*, and 320-*c* are illustrated in FIG. 3 as partially overlapping in the frequency domain, it is to be understood that the scheduling information 315 may configure multiple channels 320 having non-overlapping, overlapping, or partially overlapping frequency allocations.

The grant 310 may include one or more FDRA fields configured to indicate or schedule the multiple different frequency resource allocations. In some aspects, the grant 310 (e.g., DCI, or some other control message) may include multiple FDRA fields each including one or more bits. Each FDRA field may be associated with a respective channel 320 of the multiple channels 320 allocated by the grant 310. For example, each FDRA field may indicate a respective frequency resource allocation for the respective channel 320. In the example of FIG. 3, the grant 310 may include a first FDRA field that indicates an allocation of channel resources 305 in the frequency domain for the channel 320-*a*, a second FDRA field that indicates an allocation of channel resources 305 in the frequency domain for the channel 320-*b*, and a third FDRA field that indicates an allocation of channel resources 305 in the frequency domain for the channel 320-*c*. By including multiple FDRA fields in the grant 310, the scheduling information 315 may thereby allocate multiple channels 320 having the same or different frequency resource allocations.

In some other aspects, the grant 310 may include a single FDRA field with multiple bits. In such cases, the FDRA field may represent an example of an enhanced FDRA field that may operate similar to a TDRA field, in some aspects. For example, the FDRA field may be configured to accommodate for multiple channels having different quantiles of RBs in the frequency domain. In some aspects, the network entity 105 may transmit a control message (e.g., an RRC message, a MAC-CE, or some other control message) that indicates multiple sets of frequency resources or frequency resource allocations (e.g., a table of frequency resource allocations), and the FDRA field in the grant 310 (e.g., DCI) may indicate a subset of one or more of the sets of frequency resource allocations configured by the control message. For example, a value of the bits in the FDRA field may represent an index to one or more entries in a table of frequency resource allocations. The grant 310 may thereby allocate a different frequency resource allocation for each of the channels 320-*a*, 320-*b*, and 320-*c*.

A frequency resource allocation for a channel 320 as described herein may include an allocation of a quantity of RBs, a pattern of the RBs in the frequency domain, an offset of the RBs in the frequency domain, or any combination thereof. Each channel 320 scheduled by the scheduling information 315 may be allocated a respective quantity of RBs, a respective pattern of the RBs in the frequency domain, and a respective frequency offset of the RBs. In some aspects, multiple patterns and frequency offsets may be configured via a control message (e.g., RRC or MAC-CE), and the grant 310 (e.g., DCI) may indicate one or more of the multiple patterns and frequency offsets for each channel 320.

The UE 115 may use the channel resources 305 indicated by the scheduling information 315 for communications. If the scheduling information schedules multiple downlink channels 320, the UE 115 may monitor for or receive downlink messages via the scheduled downlink channels 320. In some aspects, the UE 115 may receive multiple repetitions of a downlink TB via the multiple downlink channels 320. If the scheduling information 315 schedules multiple uplink channels 320, the UE 115 may transmit one or more uplink messages (e.g., TBs) via the scheduled uplink channels 320. If the UE 115 has a single TB to transmit, the UE 115 may perform uplink repetition in one or more of the uplink channels 320 (e.g., to utilize all of the uplink channels 320). Additionally, or alternatively, in some cases, if the network entity 105 over-allocates the uplink channels 320, the UE 115 may transmit padding or filler information (e.g., zeros) via one or more of the allocated uplink channels 320.

Techniques described herein provide for the UE 115 to select a subset of uplink channels 320 from the multiple uplink channels 320 allocated by the scheduling information 315 to use for transmissions. For example, the UE 115 may select the channel 320-a for transmission, and the UE 115 may refrain from transmitting via the channels 320-b and 320-c, which may reduce power consumption and overhead. Techniques for uplink channel selection are described in further detail elsewhere herein, including with reference to FIGS. 4-6.

Figure 4:
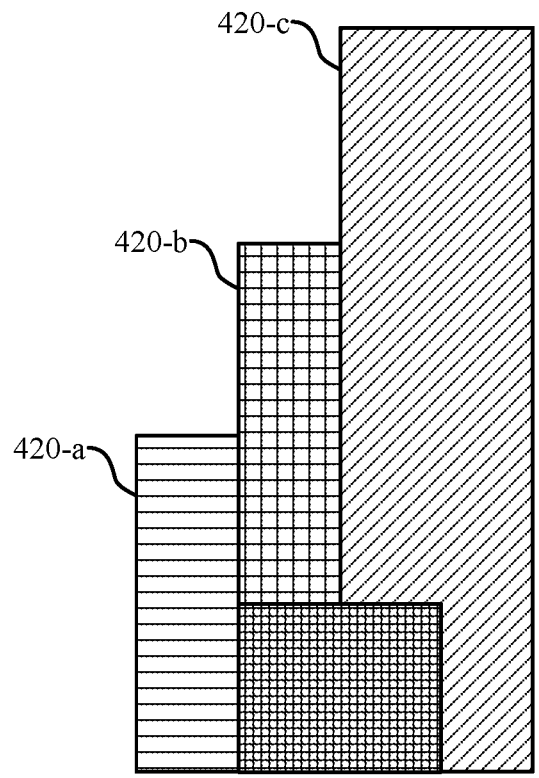
FIGS. 4-6 illustrate examples of uplink channel configurations that support frequency resource selection for multiple channels in accordance with one or more aspects of the present disclosure.
Figure 4:
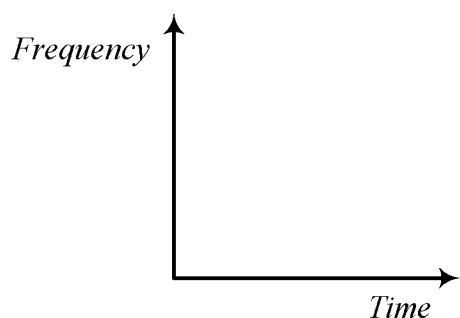

FIG. 4 illustrates an example of an uplink channel configuration 400 that supports frequency resource selection for multiple channels in accordance with one or more aspects of the present disclosure. The uplink channel configuration 400 may implement or be implemented by aspects of the wireless communications systems 100 and 200 described with reference to FIGS. 1 and 2. For example, the uplink channel configuration 400 illustrates a configuration of multiple uplink channels 420 for uplink communications between a UE 115 and a network entity 105, which may represent examples of corresponding devices as described with reference to FIGS. 1-3. In some aspects, the UE 115 may select a subset or all of the uplink channels 420 allocated for the UE 115, and the UE 115 may indicate the selection to the network entity 105.

The network entity 105 may transmit one or more grants including scheduling information that allocates the multiple uplink channels 420-a, 420-b, and 420-c, as described with reference to FIGS. 2 and 3. Each uplink channel 420 may be allocated a respective set of uplink channel resources 405 that may be overlapping, partially overlapping, or non-overlapping in the time domain and the frequency domain. For example, the scheduling information may indicate multiple uplink channel resource allocations that may each have a different quantity of RBs in the frequency domain that may be overlapping, partially overlapping, or non-overlapping in time. In some aspects, a quantity of TBs in a buffer at the UE 115 may be transmitted via fewer than all of the allocated uplink channel resources 405. For example, if the UE 115 has a single TB for transmission, the TB may be transmitted via one of the allocated uplink channels 420. If the UE 115 transmits repetitions or padding information via the remainder of uplink channels 420, the UE 115 may utilize unnecessary power or increase overhead.

As described herein, the UE 115 may select a subset of the uplink channels 420 allocated by the scheduling information and the UE 115 may refrain from transmitting via the remaining uplink channels. For example, if the UE 115 has a single TB for transmission, the UE 115 may select a single grant from among the multiple uplink channel resources 405 (e.g., multi-PUSCH) to use for transmitting the TB.

The UE 115 may receive an indication that uplink channel selection by the UE 115 is enabled. The UE 115 may receive the indication via the scheduling information or via a control message different than the scheduling information. In some aspects, the indication may be transmitted via a bit in an uplink grant or a type or format of the uplink grant (e.g., an enhanced DCI message for uplink channel selection that may be different than a multi-PUSCH DCI message) may indicate that the uplink channel selection is enabled.

If the UE 115 is configured for uplink channel selection, the UE 115 may select one or more of the uplink channels 420 allocated by the scheduling information for uplink transmission. The UE 115 may perform the channel selection based on an amount of data in a buffer of the UE 115, based on one or more channel quality metrics, or both. Each uplink channel 420 may include a respective set of uplink channel resources 405. In some aspects, the UE 115 may select all of the uplink channel resources 405 in one or more sets (e.g., one or more uplink channels 420). Additionally, or alternatively, the UE 115 may select a subset of uplink channel resources 405 from one or more sets, as described in further detail elsewhere herein, including with reference to FIG. 5.

The network entity 105 may monitor each of the allocated uplink channels 420 for uplink messages from the UE 115. To alleviate blind detection at the network entity 105 over the grants, the UE 115 as described herein may indicate which uplink channels 420 are selected by the UE 115 to the network entity 105. In the example of FIG. 4, the UE 115 may transmit the indication of the selection via one or more common resources 410, which may correspond to uplink channel resources 405 that are reserved for indicating an uplink channel selection. In some aspects, the common resources 410 may be referred to as reserved resources herein.

The common resources 410 may include uplink channel resources 405 that are common to (e.g., included within) each of the uplink channels 420 allocated by the scheduling information. The common resources 410 may be present if the uplink channels 420 are at least partially overlapping in the time domain, the frequency domain, or both, as illustrated in FIG. 4. The UE 115 may autonomously determine or detect the common resources 410 (e.g., RBs) that are common to each of the uplink channels 420 based on the allocation of the uplink channels 420. Additionally, or alternatively, the network entity 105 may transmit an indication of the common resources 410 to the UE 115 via the scheduling information, the uplink grant, an RRC configuration, a MAC-CE, or any combination thereof.

The UE 115 may transmit signaling, such as UCI, a DMRS sequence, or both via the common resources 410 to indicate which uplink channel(s) the UE 115 selects. In some aspects, the UE 115 may multiplex UCI over the common resources 410. The UCI may include an indicator that points to or identifies the uplink channel 420 the UE 115 utilized or selected to transmit a TB. For example, the UCI may include one or more bits configured to indicate an index to the uplink channel 420.

In some other aspects, one or more DMRS sequences may be defined on the common resources 410 across the uplink channel allocations, and the UE 115 may utilize one of the DMRS sequences to indicate which uplink channel resources 405 are selected by the UE 115. A quantity of the DMRS sequences may be the same as a quantity of the uplink channels 420 or sets of uplink channel resources 405, and each DMRS sequence may map to or identify a respective uplink channel 420 (e.g., K DMRS sequences mapped to K uplink channels 420).

In the example of FIG. 4, the UE 115 may select the uplink channel 420-c for transmission of a TB. The uplink channel 420-c may be allocated a respective set of uplink channel resources 405. The UE 115 may transmit UCI or a DMRS sequence within the common resources 410 that are included in the set of uplink channel resources 405 that are allocated for the uplink channel 420-c (e.g., via a subset of the set of uplink channel resources 405) to indicate that the UE 115 selected the uplink channel 420-c. The network entity 105 may receive the indication and determine to monitor for or perform blind detection in the uplink channel 420-c and to refrain from monitoring for or performing blind detection in the uplink channels 420-a and 420-b.

Although not illustrated in FIG. 4 for clarity, in some aspects, the scheduling information may allocate a respective sets of reserved resources in each of the uplink channels 420. For example, a subset of the uplink channel resources 405 in the time domain, the frequency domain, or both, may be reserved for uplink channel selection indication. In such cases, the UE 115 may transmit the UCI, the DMRS sequence, some other reference signal, or any combination thereof via the reserved resources of the selected uplink channel 420 to indicate that the UE 115 selected that uplink channel 420.

The UE 115 described herein may thereby select, from among multiple uplink channels 420 allocated by one or more uplink grants, a subset of one or more of the uplink channels 420 for transmission of uplink data. The UE 115 may indicate the selection to a network entity 105 via one or more common resources 410 or reserved resources within the selected uplink channel 420 to reduce blind detection at the network entity 105 and improve reliability and coordination between devices.

Figure 5:
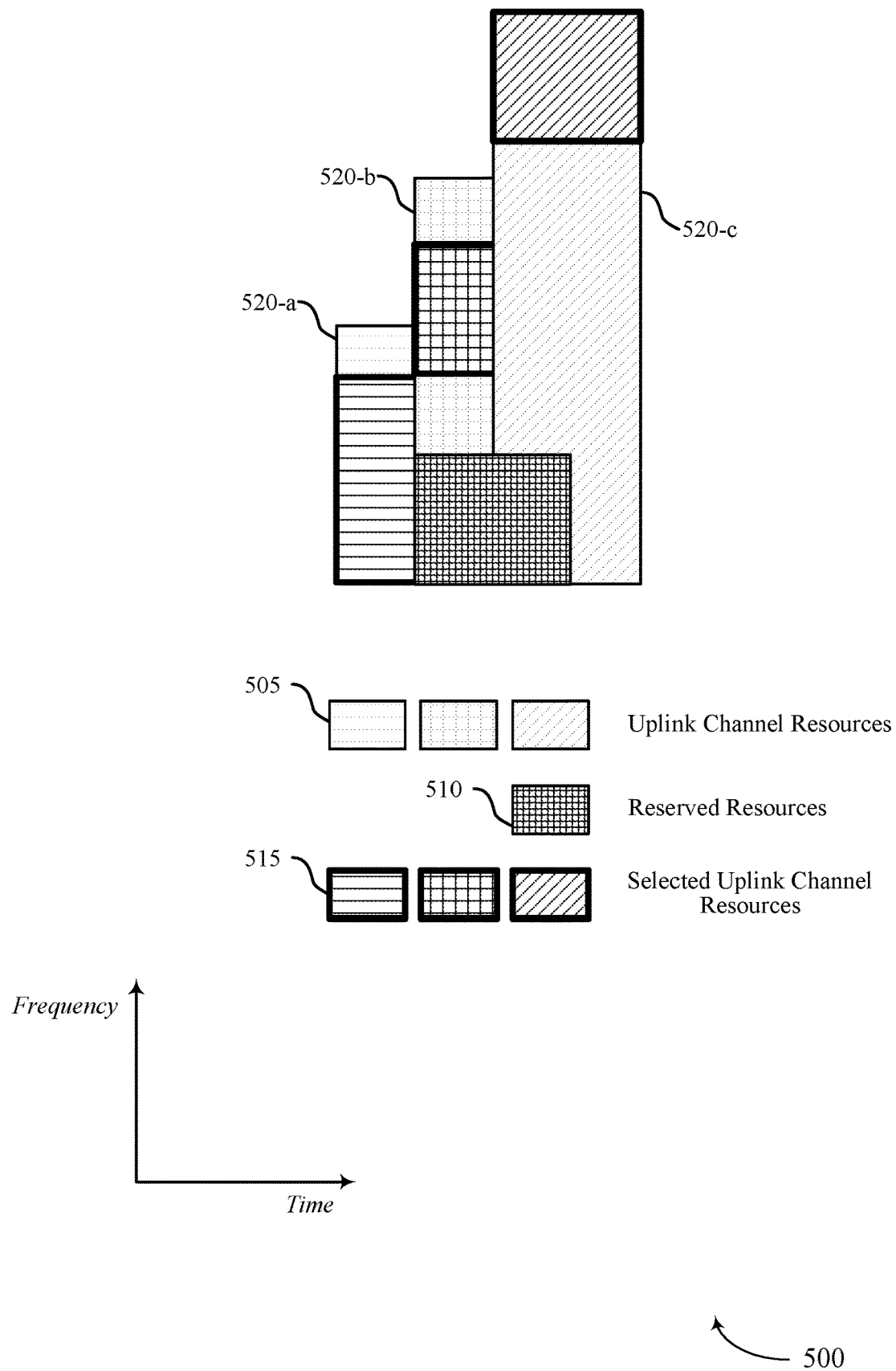

FIG. 5 illustrates an example of an uplink channel configuration 500 that supports frequency resource selection for multiple channels in accordance with one or more aspects of the present disclosure. The uplink channel configuration 500 may implement or be implemented by aspects of the wireless communications systems 100 and 200 described with reference to FIGS. 1 and 2. For example, the uplink channel configuration 500 illustrates a configuration of multiple uplink channels 520 for uplink communications between a UE 115 and a network entity 105, which may represent examples of corresponding devices as described with reference to FIGS. 1-4. In some aspects, the UE 115 may select a subset or all of the uplink channels 520 allocated for the UE 115, and the UE 115 may indicate the selection to the network entity 105.

The uplink channel configuration 500 may represent an example of the uplink channel configuration 400 described with reference to FIG. 4. For example, the multiple uplink channels 520-a, 520-b, and 520-c may include respective sets of uplink channel resources 505 and may be allocated by scheduling information transmitted via one or more uplink grants, as described with reference to FIGS. 2-4.

As described with reference to FIG. 4, the UE 115 may, in some aspects, be configured for uplink channel selection by the UE 115. In such cases, the UE 115 may select a subset of the uplink channels 520 allocated by the scheduling information and the UE 115 may refrain from transmitting via the remaining uplink channels. For example, if the UE 115 has a single TB for transmission, the UE 115 may select a single grant from among the multiple uplink channel resources 505 (e.g., multi-PUSCH) to use for transmitting the TB. The UE 115 may indicate the uplink channel selection via UCI, DMRS, or both. In some aspects, an amount of data in a buffer at the UE 115 may be transmitted via fewer than all of the uplink channel resources 505 in an allocated uplink channel 520. Additionally, or alternatively, transmission of uplink data via a subset of the uplink channel resources 505 in one or more uplink channels 520 may improve frequency diversity.

Techniques described herein provide for the UE 115 to select, from among all of the uplink channel resources 505 allocated by the scheduling information, a subset of uplink channel resources 505 from among a set of uplink channel resources 505 in a given uplink channel 520 to use for uplink transmissions. The selected subset(s) of uplink channel resources 505 may be referred to as and illustrated as selected uplink channel resources 515. By utilizing different regions (e.g., different RBs) over the different granted uplink channels 520, the UE 115 may improve frequency diversity, throughput, and reliability of the uplink communications, among other examples.

In the example of FIG. 5, the UE 115 may select lower RBs from the first uplink channel 520-a, the UE 115 may select middle RBs from the second uplink channel 520-b, and the UE 115 may select upper RBs from the third uplink channel 520-c. Although the selected uplink channel resources 515 illustrated in FIG. 5 are selected from each of the scheduled uplink channels 520, it is to be understood that the UE 115 may select a subset of uplink channel resources 505 from a single uplink channel 520, or any quantity of uplink channels 520. Additionally, or alternatively, the selected uplink channel resources 515 in each uplink channel 520 may be overlapping, non-overlapping, or partially overlapping in the frequency domain.

In some aspects, the selected uplink channel resources 515 may be contiguous or noncontiguous in the frequency domain. For example, the selected uplink channel resources 515 in the uplink channel 520-b may be contiguous to the selected uplink channel resources 515 in the uplink channel 520-a and noncontiguous to the selected uplink channel resources 515 in the uplink channel 520-c in the frequency domain. In some aspects (not illustrated in FIG. 5), the UE 115 may select a first subset of uplink channel resources 505 in a first portion of an uplink channel 520, and the UE 115 may select a second subset of uplink channel resources 505 in a second portion of the uplink channel 520 that is noncontiguous to the first portion.

The UE 115 may transmit an indication of the selection via UCI, a DMRS sequence, some other signaling, or any combination thereof. As described with reference to FIG. 4, the uplink channels 520 may include a set of one or more reserved resources 510 for transmitting the channel selection indication. If the uplink channels 520 are at least partially overlapping in time and frequency, the reserved resources 510 may include resources that are common to (e.g., included within) each of the uplink channels 520, as illustrated in FIG. 5. Additionally, or alternatively, the scheduling information may allocate a set of reserved resources 510 in each uplink channel 520. The UE 115 may transmit (e.g., multiplex) the UCI, a DMRS, or both via the reserved resources 510 that are within the selected channel 520.

In the example of FIG. 5, the UCI may include one or more bits or fields configured to indicate which uplink channel resources 505 are selected uplink channel resources 515. For example, one or more bits in the UCI may indicate whether the UE 115 selects all of an allocated uplink channel 520 or a portion of an allocated uplink channel 520. If the UE 115 selects a portion (e.g., a subset of resources), one or more bits in the UCI may provide a bitmap to indicate the selected uplink channel resources 515. For example, each subset of uplink channel resources 505 may be indexed by a respective value of the bitmap. The fields or bits in the UCI that are used to indicate a selected uplink channel 520 may be the same as or different than the fields or bits in the UCI that are used to indicate a portion of selected uplink channel resources 515.

The UE 115 may thereby select a portion of an allocated uplink channel 520 to use for uplink transmissions. The UE 115 may transmit one or more TB s via the selected uplink channel resources 515 and the UE 115 may refrain from transmitting via other uplink channel resources 505 that are not selected to reduce power consumption and overhead. The UE 115 may indicate the selected uplink channel resources 515 to a network entity 105 via UCI, a DMRS, or both to reduce blind detection and processing at the network entity 105.

Figure 6:
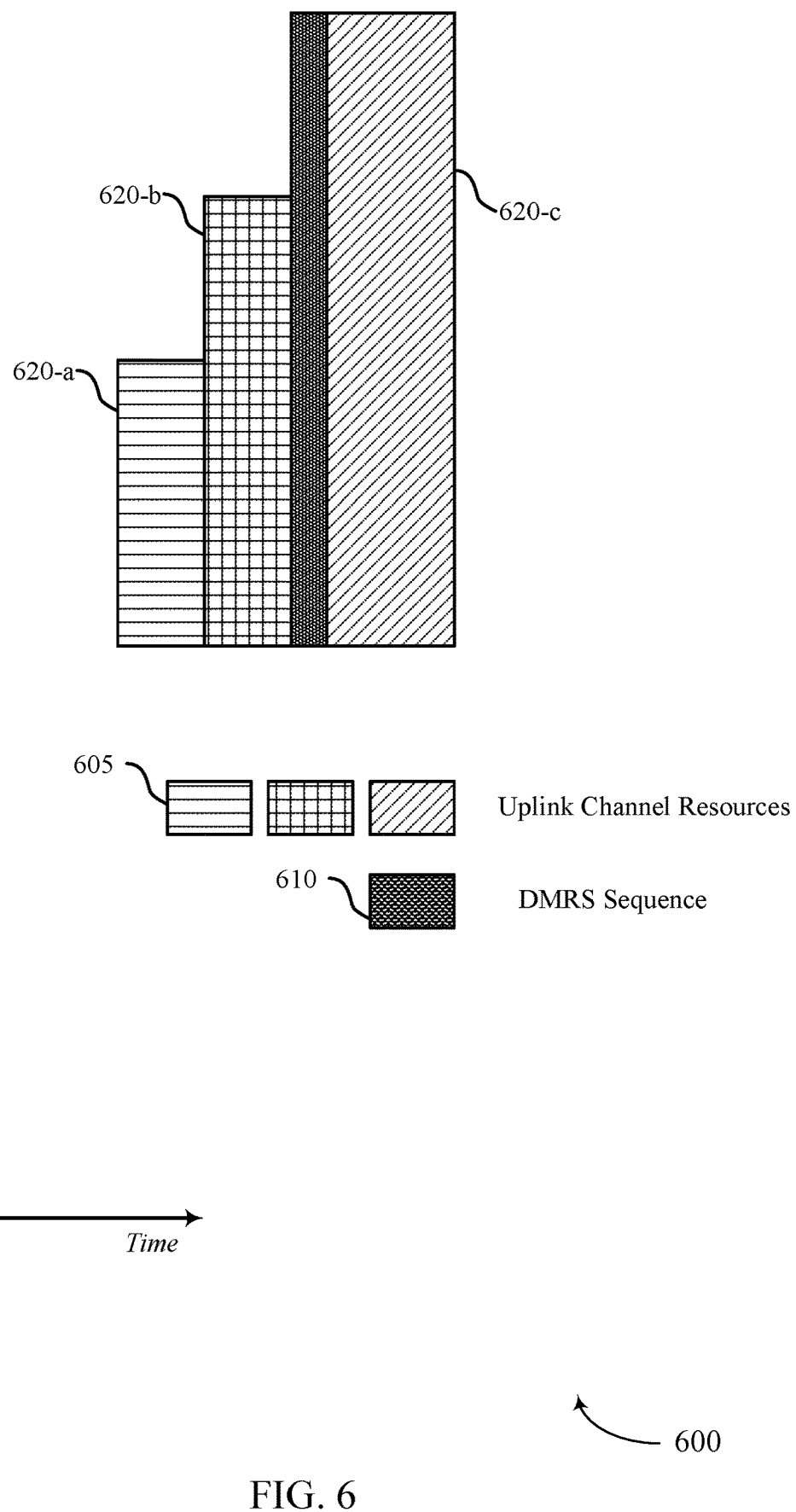

FIG. 6 illustrates an example of an uplink channel configuration 600 that supports frequency resource selection for multiple channels in accordance with one or more aspects of the present disclosure. The uplink channel configuration 600 may implement or be implemented by aspects of the wireless communications systems 100 and 200 described with reference to FIGS. 1 and 2. For example, the uplink channel configuration 600 illustrates a configuration of multiple uplink channels 620 for uplink communications between a UE 115 and a network entity 105, which may represent examples of corresponding devices as described with reference to FIGS. 1-5. In some aspects, the UE 115 may select a subset or all of the uplink channels 620 allocated for the UE 115, and the UE 115 may indicate the selection to the network entity 105.

The uplink channel configuration 600 may represent an example of the uplink channel configuration 400 and the uplink channel configuration 500 described with reference to FIGS. 4 and 5. For example, the multiple uplink channels 620-a, 620-b, and 620-c may include respective sets of uplink channel resources 605 and may be allocated by scheduling information transmitted via one or more uplink grants, as described with reference to FIGS. 2-5. The UE 115 may be configured to support uplink channel selection, and the UE 115 may select one or more of the uplink channels 620, a subset of uplink channel resources 605 within one or more of the uplink channels 620, or both, to use for transmission of one or more uplink TBs. As described with reference to FIGS. 2-5, the UE 115 may indicate which uplink channels 620 or portions of uplink channels 620 are selected to the network entity 105 to reduce blind detection.

In some aspects described herein, the UE 115 may utilize one or more DMRS sequences 610 configured to indicate the uplink channel selection. For example, each uplink channel 620 may be configured with or associated with a respective DMRS sequence 610. The DMRS sequences 610 may be configured or indicated via the scheduling information or a control message different than the scheduling information (e.g., RRC, MAC-CE). The DMRS sequences 610 may be concatenated or appended to a front of the uplink channel 620 in the time domain (e.g., a front-loaded sequence). The DMRS sequence may be transmitted via resources that span across all or a portion of RBs allocated for the respective uplink channel 620 in the frequency domain.

If the UE 115 selects all or a portion of an uplink channel 620, the UE 115 may transmit an uplink TB via the selected uplink channel 620, and the UE 115 may transmit the DMRS sequence 610 associated with the selected uplink channel 620. The front-loaded DMRS sequence 610 may indicate, to the network entity 105, that the UE 115 selected the corresponding uplink channel 620, which may provide for early detection of the utilized uplink channel 620. In the example of FIG. 6, the UE 115 may select the uplink channel resources 605 in the uplink channel 620-c, and the UE 115 may transmit the DMRS sequence 610 via a first portion of the uplink channel resources 605 in the uplink channel 620-c to indicate the selection. The UE 115 may refrain from transmitting via at least a portion of the uplink channels 620-a and 620-b based on the selection. For example, the UE 115 may refrain from transmitting via uplink channel resources 605 in the uplink channels 620-a and 620-b that are non-overlapping with the uplink channel resources 605 in the selected uplink channel 620-c.

In some aspects, the UE 115 may select a portion of an uplink channel 620-c. For example, the UE 115 may select a subset of uplink channel resources 605 from within one or more of the scheduled uplink channels 620, as described and illustrated with reference to FIG. 5. The UE 115 may, in some aspects, still transmit a corresponding DMRS sequence 610 to indicate the selected uplink channel resources 605. For example, the DMRS sequence 610 may indicate that the network entity 105 is to monitor at least some uplink channel resources 605 in the corresponding uplink channel 620. Additionally, or alternatively, the DMRS sequence 610 may include one or more fields or bits configured to indicate the selected subset of uplink channel resources 605 within the uplink channel 620.

The UE 115 may transmit one or more TBs via the selected uplink channel resources 605. The UE 115 may thereby select a subset of allocated uplink channel resources 605 to use for an uplink transmission and may indicate the selection to a network entity 105 via a DMRS sequence 610, which may reduce power consumption, overhead, and processing at both the network entity 105 and the UE 115.

Figure 7:
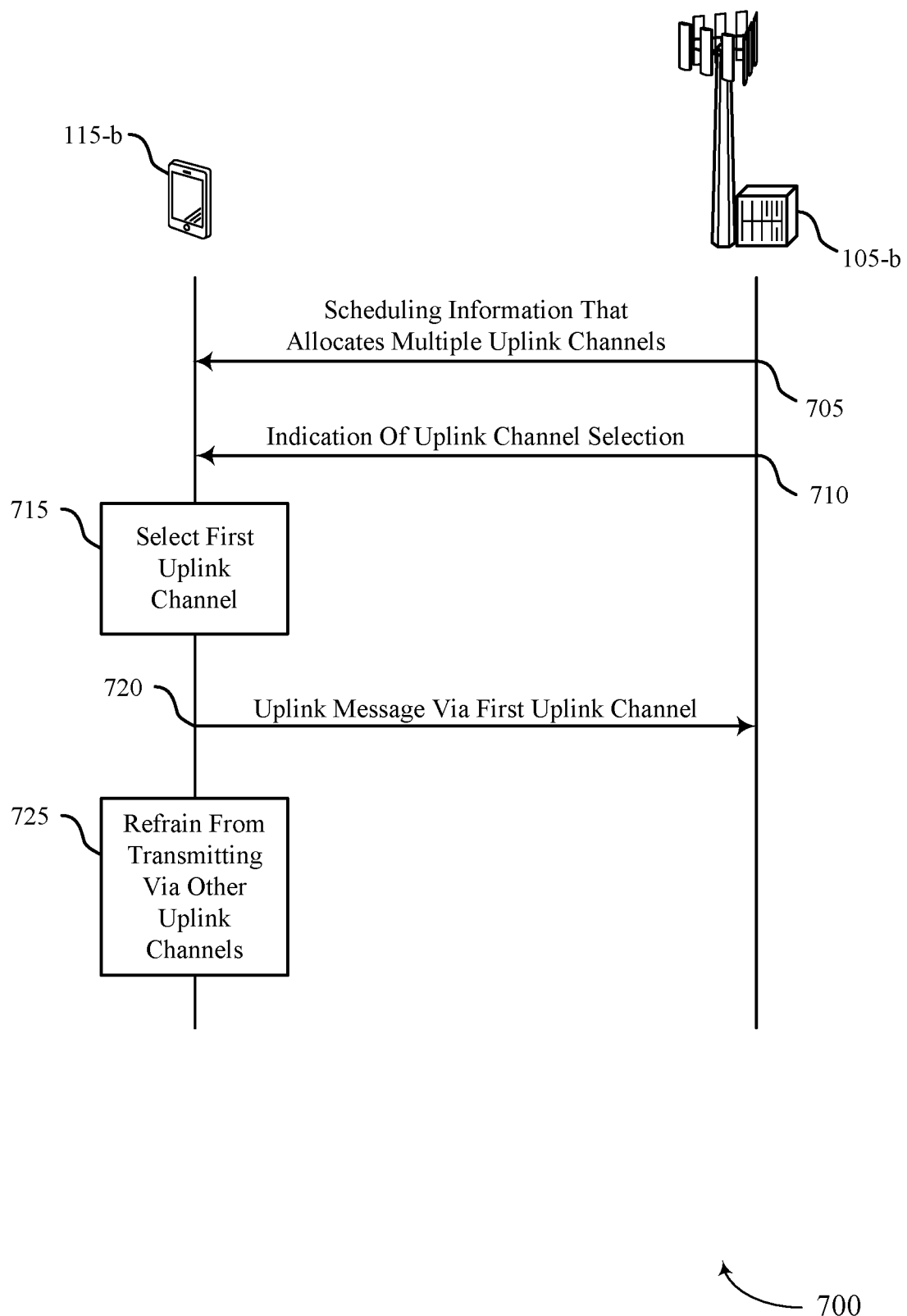
FIG. 7 illustrates an example of a process flow that supports frequency resource selection for multiple channels in accordance with one or more aspects of the present disclosure.

FIG. 7 illustrates an example of a process flow 700 that supports frequency resource selection for multiple channels in accordance with one or more aspects of the present disclosure. The process flow 700 may implement or be implemented by aspects of the wireless communications systems 100 and 200, the channel configuration scheme 300, or the uplink channel configurations 400, 500, and 600 described with reference to FIGS. 1-6. For example, the process flow 700 illustrates communications between a UE 115-b and a network entity 105-b, which may represent examples of corresponding devices as described with reference to FIGS. 1-6.

In the following description of the process flow 700, the operations between the UE 115-b and the network entity 105-b may be performed in different orders or at different times. Some operations may also be left out of the process flow 700, or other operations may be added. Although the UE 115-b and the network entity 105-b are shown performing the operations of the process flow 700, some aspects of some operations may also be performed by one or more other wireless devices.

At 705, the network entity 105-b may transmit scheduling information to the UE 115-b. The scheduling information may allocate multiple uplink channels of a same channel type to the UE 115-b. In some aspects, each uplink channel may correspond to or be allocated by a set of uplink channel resources (e.g., PUSCH resources). The scheduling information may indicate a respective set of frequency resources for each of the uplink channels. That is, each uplink channel may be scheduled with a respective set of frequency resources that may be fully, partially, or non-overlapping in a frequency domain. The scheduling information may be transmitted via DCI, a MAC-CE, an RRC message, some other control signaling, or any combination thereof.

At 710, in some aspects, the network entity 105-b may transmit, to the UE 115-b, an indication that uplink channel selection by the UE 115-b is enabled for the multiple uplink channels allocated via the scheduling information. In some aspects, the indication may be transmitted via a control message that is different than the scheduling information. Additionally, or alternatively, the indication may be transmitted via the scheduling information. For example, if the scheduling information includes DCI, the indication may be transmitted via a bit in the DCI, or a format of the DCI may indicate that uplink channel selection is enabled by the UE 115-*b*.

At 715, the UE 115-*b* may select, from among the multiple uplink channels allocated via the scheduling information, at least a portion of a first uplink channel that includes a first set of frequency resources. The UE 115-*b* may select the first uplink channel based on a quantity of data in a buffer at the UE 115-*b*, based on one or more communications parameters (e.g., a channel quality), based on a power level of the UE 115-*b*, or any combination thereof.

At 720, the UE 115-*b* may transmit an uplink message to the network entity 105-*b* via the first uplink channel based on selecting the first uplink channel. In some aspects, the UE 115-*b* may transmit, via at least a portion of the first set of frequency resources in the first uplink channel, an indication that the UE 115-*b* selected the first uplink channel. The indication may be transmitted via UCI, a DMRS, or some other signaling, as described with reference to FIGS. 4-6.

At 725, based on selecting the first uplink channel, the UE 115-*b* may refrain from transmitting via the other uplink channels allocated via the scheduling information (or, for each of the other uplink channels, refrain from transmitting via at least a portion of the other uplink channel). The second uplink channel may be associated with a second set of frequency resources. That is, the UE 115-*b* may select fewer than all of the uplink channels allocated via the scheduling information, and the UE 115-*b* may refrain from transmitting on the remaining unselected channels, which may reduce overhead and power consumption by the UE 115-*b*.

Figure 8:
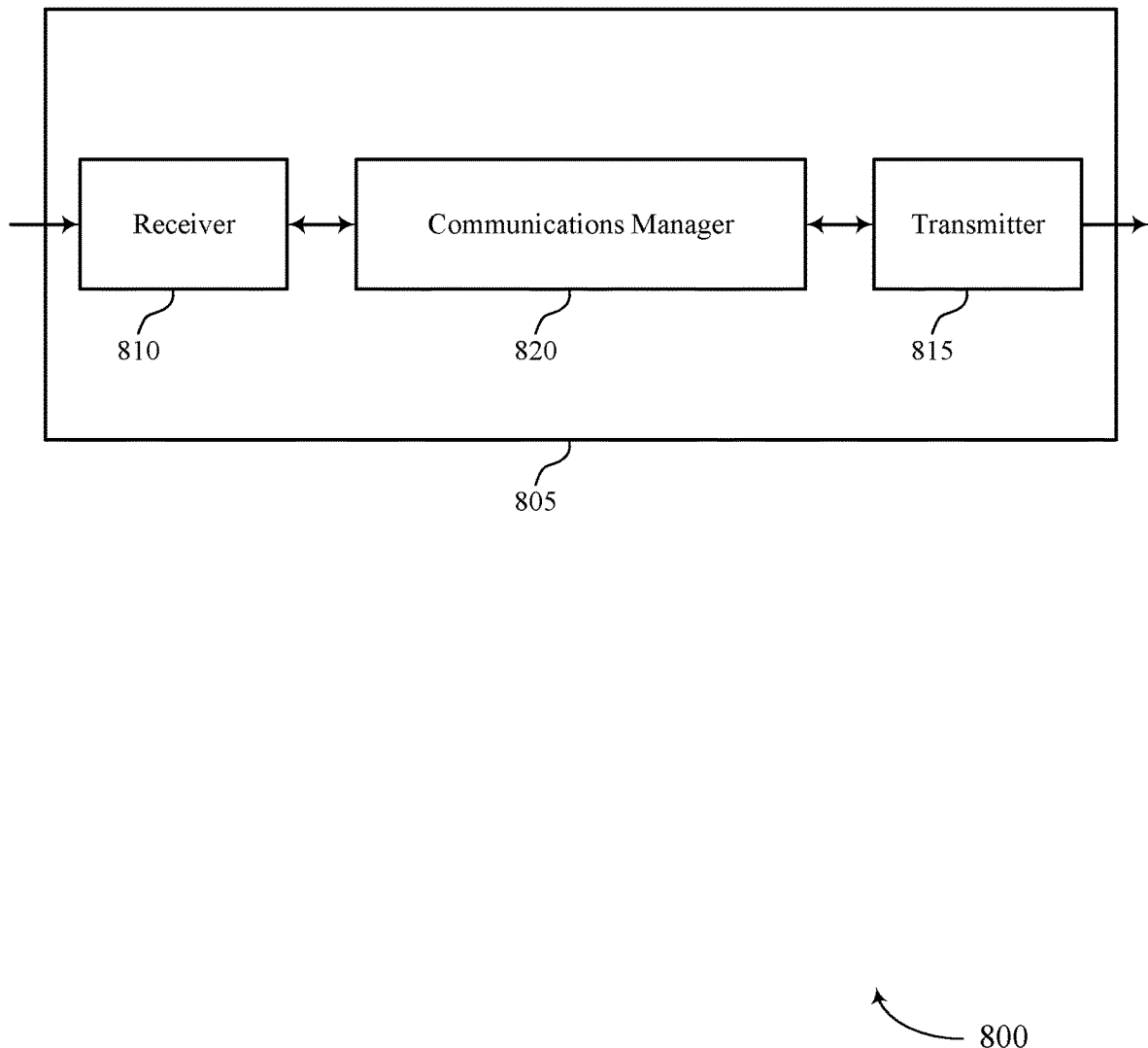
FIGS. 8 and 9 show block diagrams of devices that support frequency resource selection for multiple channels in accordance with one or more aspects of the present disclosure.

FIG. 8 shows a block diagram 800 of a device 805 that supports frequency resource selection for multiple channels in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to frequency resource selection for multiple channels). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to frequency resource selection for multiple channels). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of frequency resource selection for multiple channels as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 may be configured as or otherwise support a means for receiving scheduling information that allocates a set of multiple uplink channels of a same channel type to the UE, where the scheduling information indicates respective sets of frequency resources for the set of multiple uplink channels. The communications manager 820 may be configured as or otherwise support a means for selecting, from among the set of multiple uplink channels, a first uplink channel that includes a first set of frequency resources. The communications manager 820 may be configured as or otherwise support a means for transmitting an uplink message via the first uplink channel based on the selecting. The communications manager 820 may be configured as or otherwise support a means for refraining from transmitting via at least a portion of a second uplink channel of the set of multiple uplink channels based on the selecting, the second uplink channel including a second set of frequency resources.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources, among other advantages. For example, by selecting a subset of uplink channels from among a set of multiple uplink channels allocated via scheduling information, a processor of the device 805 (e.g., a UE 115) may refrain from excessive transmissions via overallocated resources, which may reduce processing and power consumption and may reduce overhead. In some aspects, the remaining unselected resources may be used for other communications, or may be null, which may reduce interference with other communications, thereby improving utilization of communication resources and communication reliability.

Figure 9:
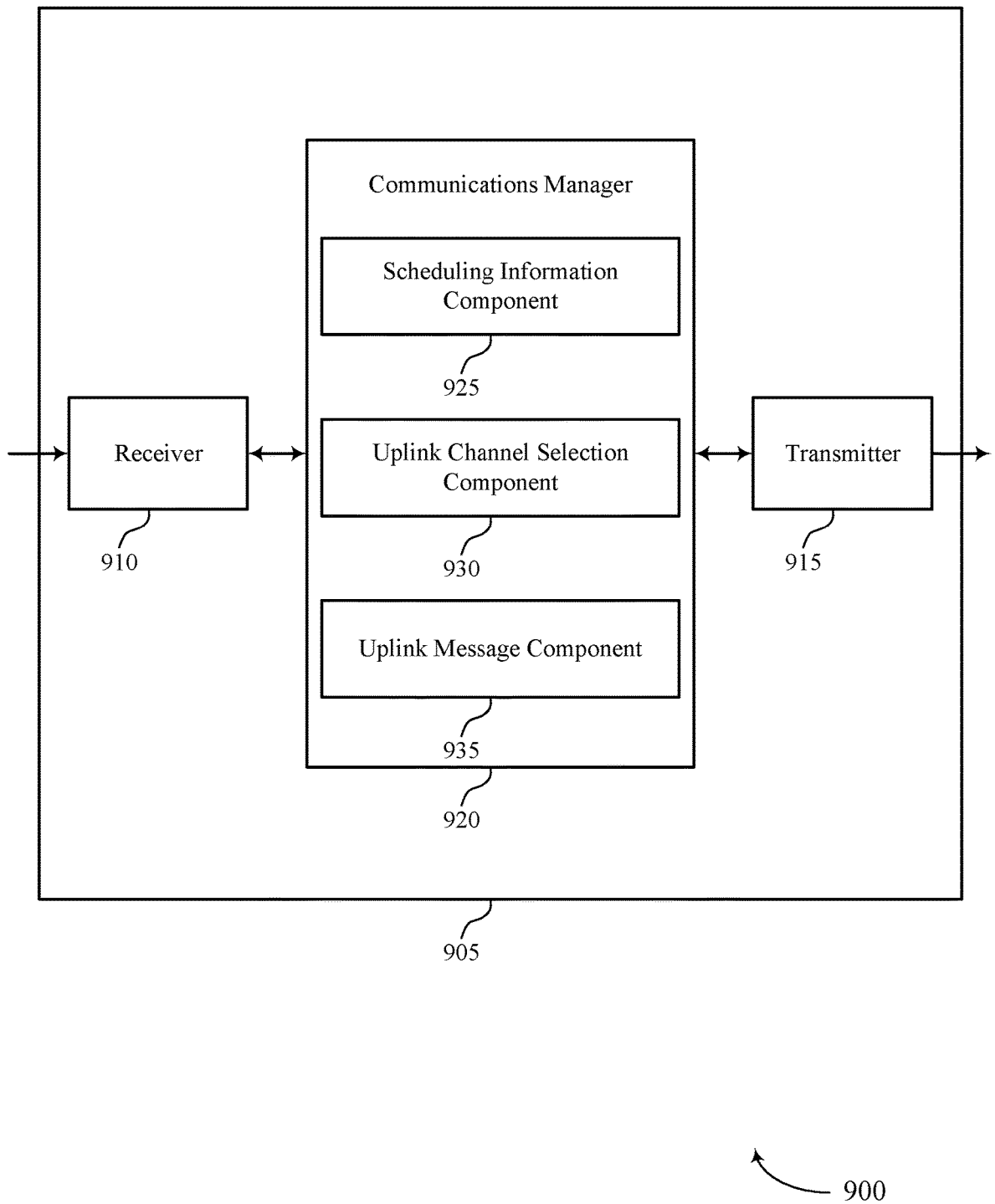

FIG. 9 shows a block diagram 900 of a device 905 that supports frequency resource selection for multiple channels in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to frequency resource selection for multiple channels). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to frequency resource selection for multiple channels). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of frequency resource selection for multiple channels as described herein. For example, the communications manager 920 may include a scheduling information component 925, an uplink channel selection component 930, an uplink message component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The scheduling information component 925 may be configured as or otherwise support a means for receiving scheduling information that allocates a set of multiple uplink channels of a same channel type to the UE, where the scheduling information indicates respective sets of frequency resources for the set of multiple uplink channels. The uplink channel selection component 930 may be configured as or otherwise support a means for selecting, from among the set of multiple uplink channels, a first uplink channel that includes a first set of frequency resources. The uplink message component 935 may be configured as or otherwise support a means for transmitting an uplink message via the first uplink channel based on the selecting. The uplink message component 935 may be configured as or otherwise support a means for refraining from transmitting via at least a portion of a second uplink channel of the set of multiple uplink channels based on the selecting, the second uplink channel including a second set of frequency resources.

Figure 10:
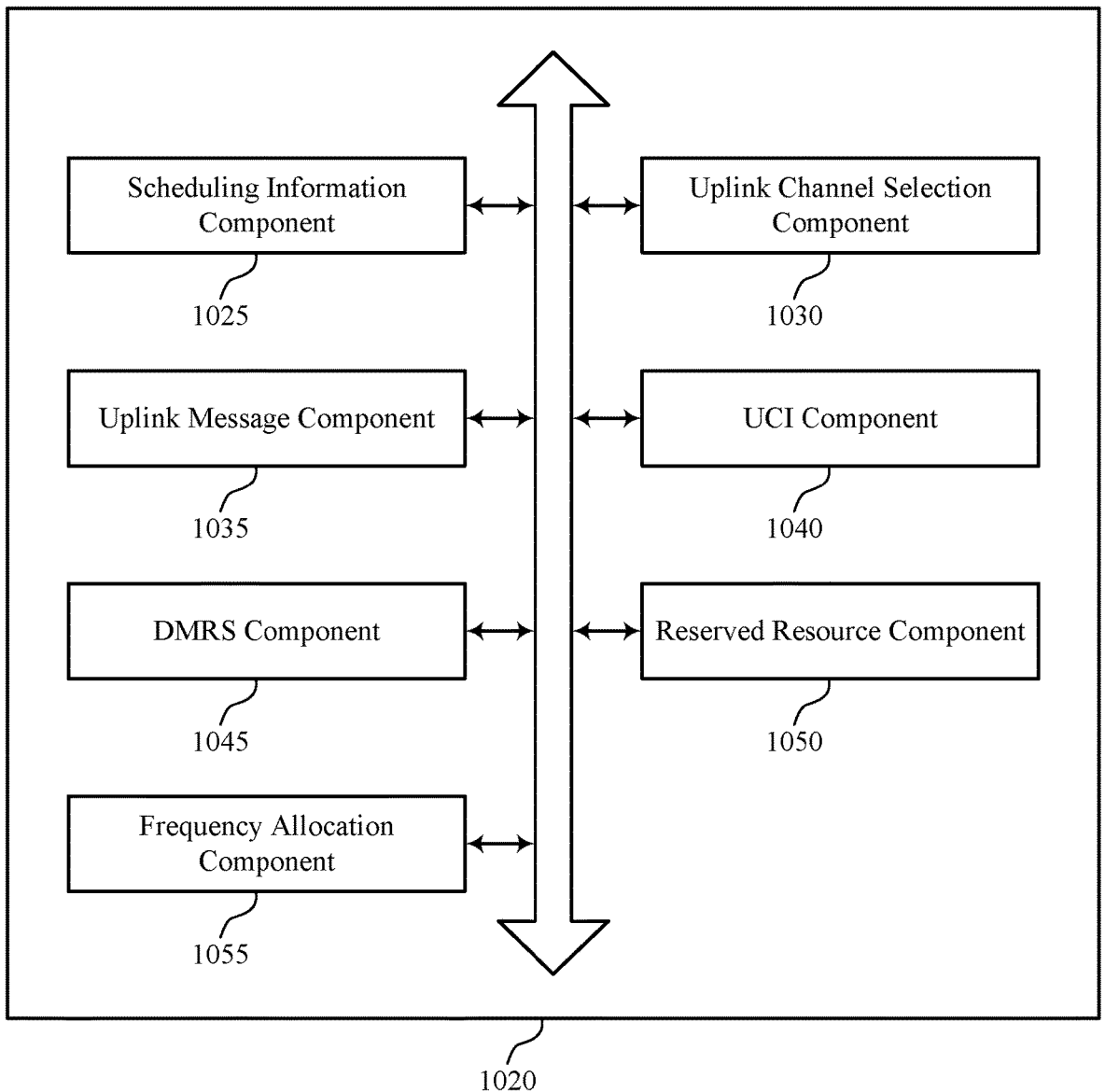
FIG. 10 shows a block diagram of a communications manager that supports frequency resource selection for multiple channels in accordance with one or more aspects of the present disclosure.

FIG. 10 shows a block diagram 1000 of a communications manager 1020 that supports frequency resource selection for multiple channels in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of frequency resource selection for multiple channels as described herein. For example, the communications manager 1020 may include a scheduling information component 1025, an uplink channel selection component 1030, an uplink message component 1035, a UCI component 1040, a DMRS component 1045, a reserved resource component 1050, a frequency allocation component 1055, or any combination thereof. Each of these components may communicate, directly or indirectly, with one another (e.g., via one or more buses).

The communications manager 1020 may support wireless communication at a UE in accordance with examples as disclosed herein. The scheduling information component 1025 may be configured as or otherwise support a means for receiving scheduling information that allocates a set of multiple uplink channels of a same channel type to the UE, where the scheduling information indicates respective sets of frequency resources for the set of multiple uplink channels. The uplink channel selection component 1030 may be configured as or otherwise support a means for selecting, from among the set of multiple uplink channels, a first uplink channel that includes a first set of frequency resources. The uplink message component 1035 may be configured as or otherwise support a means for transmitting an uplink message via the first uplink channel based on the selecting. In some examples, the uplink message component 1035 may be configured as or otherwise support a means for refraining from transmitting via at least a portion of a second uplink channel of the set of multiple uplink channels based on the selecting, the second uplink channel including a second set of frequency resources.

In some examples, to support receiving the scheduling information, the uplink channel selection component 1030 may be configured as or otherwise support a means for receiving, via the scheduling information, an indication that uplink channel selection by the UE is enabled for the set of multiple uplink channels, where the UE selecting the first uplink channel may be based on the indication that uplink channel selection is enabled. In some examples, the scheduling information includes a DCI message. In some examples, the indication that uplink channel selection by the UE is enabled for the set of multiple uplink channels includes a format of the DCI message.

In some examples, the set of multiple uplink channels are at least partially overlapping in a frequency domain, and the UCI component 1040 may be configured as or otherwise support a means for transmitting, within a subset of the first set of frequency resources that is common to the set of multiple uplink channels, UCI that indicates that the UE has selected the first uplink channel from among the set of multiple uplink channels.

In some examples, the UCI component 1040 may be configured as or otherwise support a means for selecting a second subset of the first set of frequency resources for transmitting the uplink message, where the uplink message may be transmitted within the second subset of the first set of frequency resources, and where the UCI may further indicate that the UE has selected the second subset for transmitting the uplink message.

In some examples, the reserved resource component 1050 may be configured as or otherwise support a means for receiving, via the scheduling information or a control message that is different than the scheduling information, an indication of the subset of the first set of frequency resources that is common to the set of multiple uplink channels.

In some examples, the set of multiple uplink channels are at least partially overlapping in a frequency domain, and the DMRS component 1045 may be configured as or otherwise support a means for transmitting, via a subset of the first set of frequency resources, a DMRS sequence that indicates that the UE has selected the first uplink channel from among the set of multiple uplink channels, where the subset of the first set of frequency resources is common to the set of multiple uplink channels.

In some examples, each of the set of multiple uplink channels includes a respective set of reserved resources for UCI, and the reserved resource component 1050 may be configured as or otherwise support a means for transmitting, via the respective set of reserved resources within the first uplink channel, UCI that indicates that the UE has selected the first uplink channel from among the set of multiple uplink channels.

In some examples, each of the set of multiple uplink channels is associated with a respective DMRS sequence, and the DMRS component 1045 may be configured as or otherwise support a means for transmitting, via a portion of the first uplink channel, the respective DMRS sequence for the first uplink channel to indicate that the UE has selected the first uplink channel from among the set of multiple uplink channels.

In some examples, to support receiving the scheduling information, the frequency allocation component 1055 may be configured as or otherwise support a means for receiving, within the scheduling information, a set of multiple FDRA fields that each allocate a respective uplink channel of the set of multiple uplink channels.

In some examples, the frequency allocation component 1055 may be configured as or otherwise support a means for receiving a control message that indicates a set of multiple sets of frequency resources, where an FDRA field within the scheduling information indicates a subset of the set of multiple sets of frequency resources, the subset including the respective sets of frequency resources for the set of multiple uplink channels.

In some examples, to support receiving the scheduling information, the scheduling information component 1025 may be configured as or otherwise support a means for receiving a DCI message that allocates the set of multiple uplink channels to the UE and indicates the respective sets of frequency resources for the set of multiple uplink channels.

In some examples, to support receiving the scheduling information, the scheduling information component 1025 may be configured as or otherwise support a means for receiving at least one configured grant that allocates the set of multiple uplink channels to the UE and indicates the respective sets of frequency resources for the set of multiple uplink channels.

In some examples, the set of multiple uplink channels allocated to the UE may be overlapping in a time domain. In some examples, the set of multiple uplink channels allocated to the UE may be partially overlapping or non-overlapping in a frequency domain.

Figure 11:
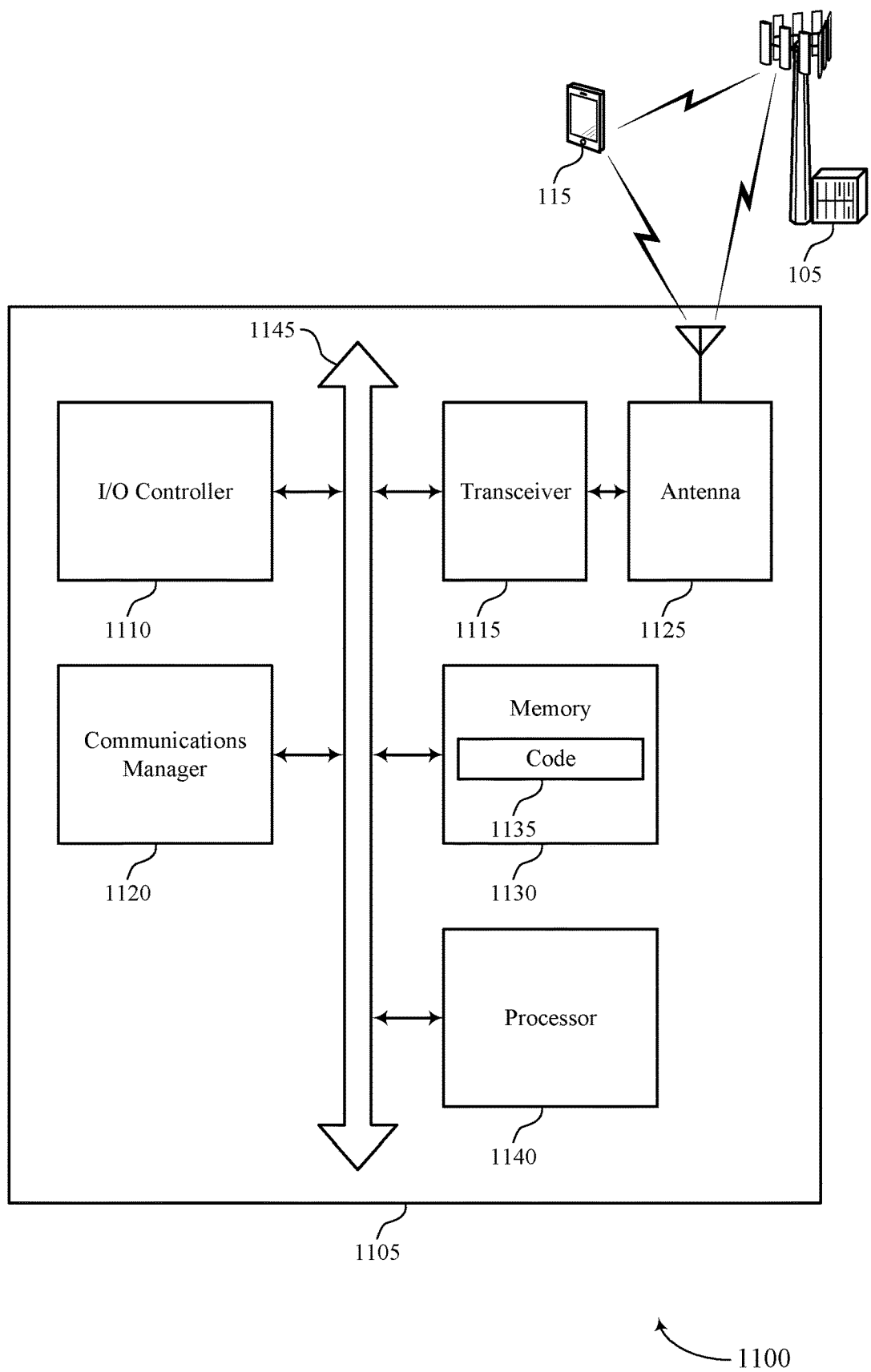
FIG. 11 shows a diagram of a system including a device that supports frequency resource selection for multiple channels in accordance with one or more aspects of the present disclosure.

FIG. 11 shows a diagram of a system 1100 including a device 1105 that supports frequency resource selection for multiple channels in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting frequency resource selection for multiple channels). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving scheduling information that allocates a set of multiple uplink channels of a same channel type to the UE, where the scheduling information indicates respective sets of frequency resources for the set of multiple uplink channels. The communications manager 1120 may be configured as or otherwise support a means for selecting, from among the set of multiple uplink channels, a first uplink channel that includes a first set of frequency resources. The communications manager 1120 may be configured as or otherwise support a means for transmitting an uplink message via the first uplink channel based on the selecting. The communications manager 1120 may be configured as or otherwise support a means for refraining from transmitting via at least a portion of a second uplink channel of the set of multiple uplink channels based on the selecting, the second uplink channel including a second set of frequency resources.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, and longer battery life, among other advantages.

In some examples, the communications manager 1120 may be configured to perform various operations (e.g., receiving, monitoring, transmitting) using or otherwise in cooperation with the transceiver 1115, the one or more antennas 1125, or any combination thereof. For example, the communications manager 1120 may be configured to receive or transmit messages or other signaling as described herein via the transceiver 1115. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of frequency resource selection for multiple channels as described herein, or the processor 1140 and the memory 1130 may be otherwise configured to perform or support such operations.

Figure 12:
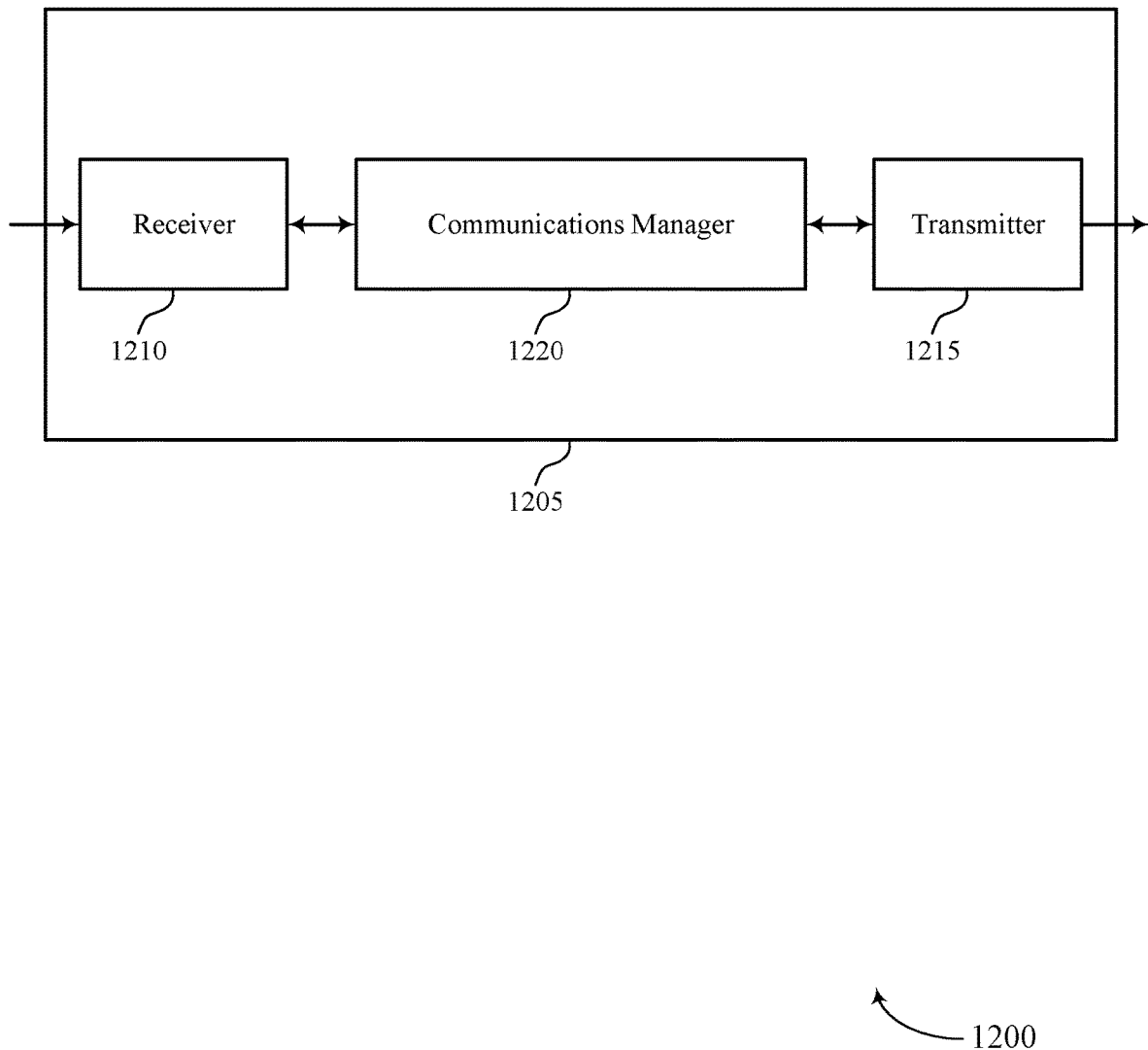
FIGS. 12 and 13 show block diagrams of devices that support frequency resource selection for multiple channels in accordance with one or more aspects of the present disclosure.

FIG. 12 shows a block diagram 1200 of a device 1205 that supports frequency resource selection for multiple channels in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of frequency resource selection for multiple channels as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 may be configured as or otherwise support a means for transmitting scheduling information that allocates a set of multiple uplink channels of a same channel type to a UE, where the scheduling information may indicate respective sets of frequency resources for the set of multiple uplink channels. The communications manager 1220 may be configured as or otherwise support a means for transmitting an indication that uplink channel selection by the UE is enabled for the set of multiple uplink channels. The communications manager 1220 may be configured as or otherwise support a means for receiving an uplink message via a first uplink channel based on identifying that the UE has selected the first uplink channel from among the set of multiple uplink channels, where the first uplink channel includes a first set of frequency resources.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced processing, reduced power consumption, and more efficient utilization of communication resources.

Figure 13:
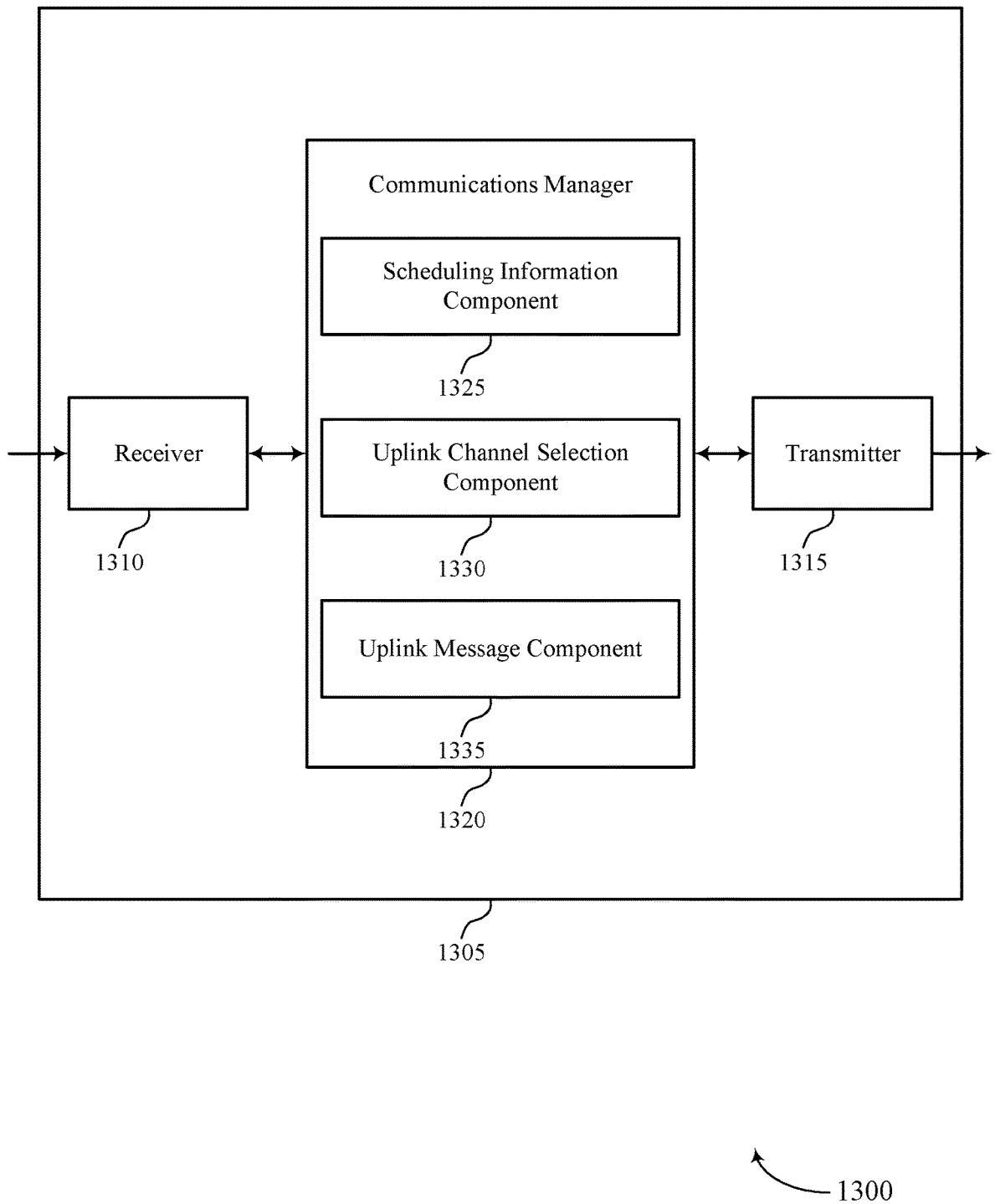

FIG. 13 shows a block diagram 1300 of a device 1305 that supports frequency resource selection for multiple channels in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of frequency resource selection for multiple channels as described herein. For example, the communications manager 1320 may include a scheduling information component 1325, an uplink channel selection component 1330, an uplink message component 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. The scheduling information component 1325 may be configured as or otherwise support a means for transmitting scheduling information that allocates a set of multiple uplink channels of a same channel type to a UE, where the scheduling information may indicate respective sets of frequency resources for the set of multiple uplink channels. The uplink channel selection component 1330 may be configured as or otherwise support a means for transmitting an indication that uplink channel selection by the UE is enabled for the set of multiple uplink channels. The uplink message component 1335 may be configured as or otherwise support a means for receiving an uplink message via a first uplink channel based on identifying that the UE has selected the first uplink channel from among the set of multiple uplink channels, where the first uplink channel includes a first set of frequency resources.

Figure 14:
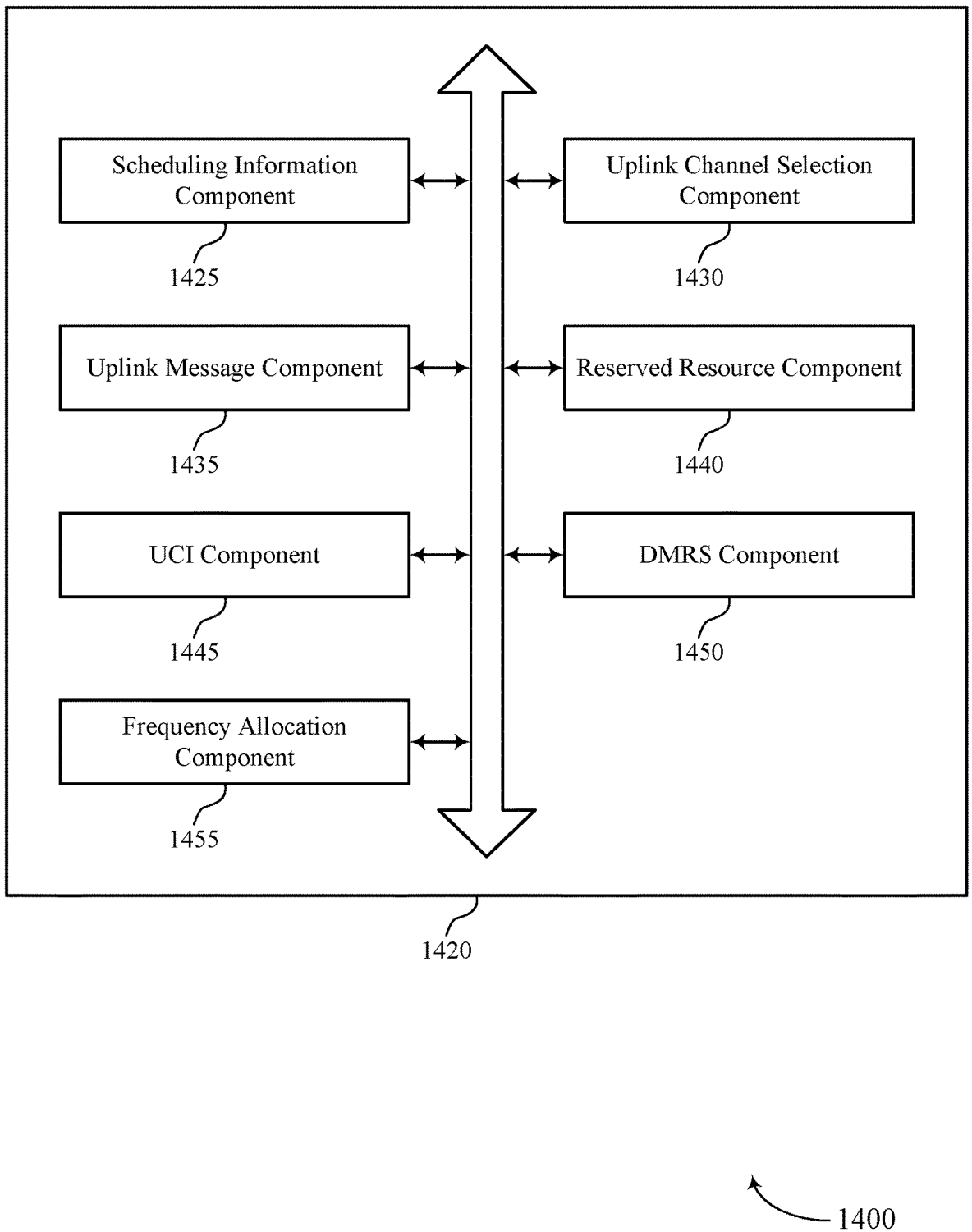
FIG. 14 shows a block diagram of a communications manager that supports frequency resource selection for multiple channels in accordance with one or more aspects of the present disclosure.

FIG. 14 shows a block diagram 1400 of a communications manager 1420 that supports frequency resource selection for multiple channels in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of frequency resource selection for multiple channels as described herein. For example, the communications manager 1420 may include a scheduling information component 1425, an uplink channel selection component 1430, an uplink message component 1435, a reserved resource component 1440, a UCI component 1445, a DMRS component 1450, a frequency allocation component 1455, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The scheduling information component 1425 may be configured as or otherwise support a means for transmitting scheduling information that allocates a set of multiple uplink channels of a same channel type to a UE, where the scheduling information may indicate respective sets of frequency resources for the set of multiple uplink channels. The uplink channel selection component 1430 may be configured as or otherwise support a means for transmitting an indication that uplink channel selection by the UE is enabled for the set of multiple uplink channels. The uplink message component 1435 may be configured as or otherwise support a means for receiving an uplink message via a first uplink channel based on identifying that the UE has selected the first uplink channel from among the set of multiple uplink channels, where the first uplink channel includes a first set of frequency resources.

In some examples, to support transmitting the scheduling information, the uplink channel selection component 1430 may be configured as or otherwise support a means for transmitting, within the scheduling information, the indication that uplink channel selection by the UE is enabled for the set of multiple uplink channels.

In some examples, the set of multiple uplink channels are at least partially overlapping in a frequency domain, and the reserved resource component 1440 may be configured as or otherwise support a means for transmitting, via the scheduling information or a control message that is different than the scheduling information, an indication of a subset of the first set of frequency resources that is common to the set of multiple uplink channels. In some examples, the set of multiple uplink channels are at least partially overlapping in a frequency domain, and the uplink channel selection component 1430 may be configured as or otherwise support a means for receiving, via the subset of the first set of frequency resources, an indication that the UE has selected, from among the set of multiple uplink channels, at least a portion of the first set of frequency resources in the first uplink channel for transmitting the uplink message, where identifying that the UE has selected the first uplink channel may be based upon receiving the indication.

In some examples, each of the set of multiple uplink channels includes a respective set of reserved resources for uplink control information, and the UCI component 1445 may be configured as or otherwise support a means for receiving, via the respective set of reserved resources within the first uplink channel, UCI that indicates that the UE selected the first uplink channel from among the set of multiple uplink channels, where identifying that the UE has selected the first uplink channel is based upon receiving the indication.

In some examples, each of the set of multiple uplink channels is associated with a respective DMRS sequence, and the DMRS component 1450 may be configured as or otherwise support a means for receiving, via a portion of the first uplink channel, the respective DMRS sequence for the first uplink channel, where identifying that the UE selected the first uplink channel may be based on receiving the respective DMRS sequence for the first uplink channel.

In some examples, to support transmitting the scheduling information, the frequency allocation component 1455 may be configured as or otherwise support a means for transmitting, within the scheduling information, a set of multiple FDRA fields that each allocate a respective uplink channel of the set of multiple uplink channels.

In some examples, the frequency allocation component 1455 may be configured as or otherwise support a means for transmitting a control message that indicates a set of multiple sets of frequency resources, where an FDRA field within the scheduling information indicates a subset of the set of multiple sets of frequency resources, the subset including the respective sets of frequency resources for the set of multiple uplink channels.

In some examples, to support transmitting the scheduling information, the scheduling information component 1425 may be configured as or otherwise support a means for transmitting a DCI message or at least one configured grant that allocates the set of multiple uplink channels to the UE and indicates the respective sets of frequency resources for the set of multiple uplink channels.

In some examples, no signaling may be received from the UE within at least a portion of a second uplink channel of the set of multiple uplink channels, the second uplink channel including a second set of frequency resources set. In some examples, the set of multiple uplink channels allocated to the UE are overlapping in a time domain. In some examples, the set of multiple uplink channels allocated to the UE are partially overlapping or non-overlapping in a frequency domain.

Figure 15:
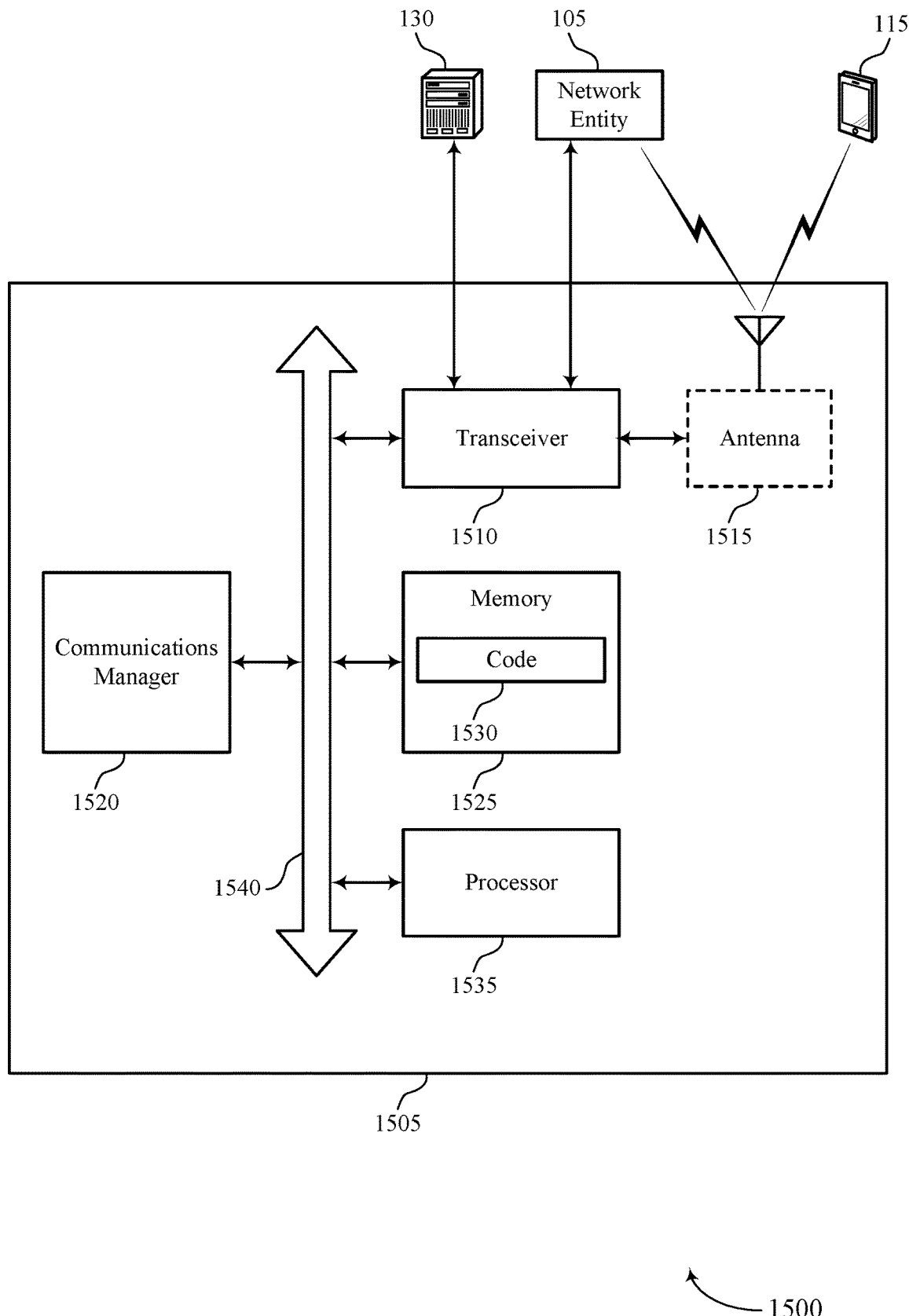
FIG. 15 shows a diagram of a system including a device that supports frequency resource selection for multiple channels in accordance with one or more aspects of the present disclosure.

FIG. 15 shows a diagram of a system 1500 including a device 1505 that supports frequency resource selection for multiple channels in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting frequency resource selection for multiple channels). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505 and may process information received from other components (such as inputs or signals) or output information to other components. For example, a chip or modem of the device 1505 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1505 may transmit information output from the chip or modem. In some implementations, the second interface may refer to an interface between the processing system of the chip or modem and a receiver, such that the device 1505 may obtain information or signal inputs, and the information may be passed to the processing system. A person having ordinary skill in the art will readily recognize that the first interface also may obtain information or signal inputs, and the second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105 and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 may be configured as or otherwise support a means for transmitting scheduling information that allocates a set of multiple uplink channels of a same channel type to a UE, where the scheduling information indicates respective sets of frequency resources for the set of multiple uplink channels. The communications manager 1520 may be configured as or otherwise support a means for transmitting an indication that uplink channel selection by the UE is enabled for the set of multiple uplink channels. The communications manager 1520 may be configured as or otherwise support a means for receiving an uplink message via a first uplink channel based on identifying that the UE has selected the first uplink channel from among the set of multiple uplink channels, where the first uplink channel includes a first set of frequency resources.

By including or configuring the communications manager 1520 in accordance with examples as described herein, the device 1505 may support techniques for improved communication reliability, reduced latency, improved user experience related to reduced processing, reduced power consumption, more efficient utilization of communication resources, improved coordination between devices, and longer battery.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. For example, the communications manager 1520 may be configured to receive or transmit messages or other signaling as described herein via the transceiver 1510. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of frequency resource selection for multiple channels as described herein, or the processor 1535 and the memory 1525 may be otherwise configured to perform or support such operations.

Figure 16:
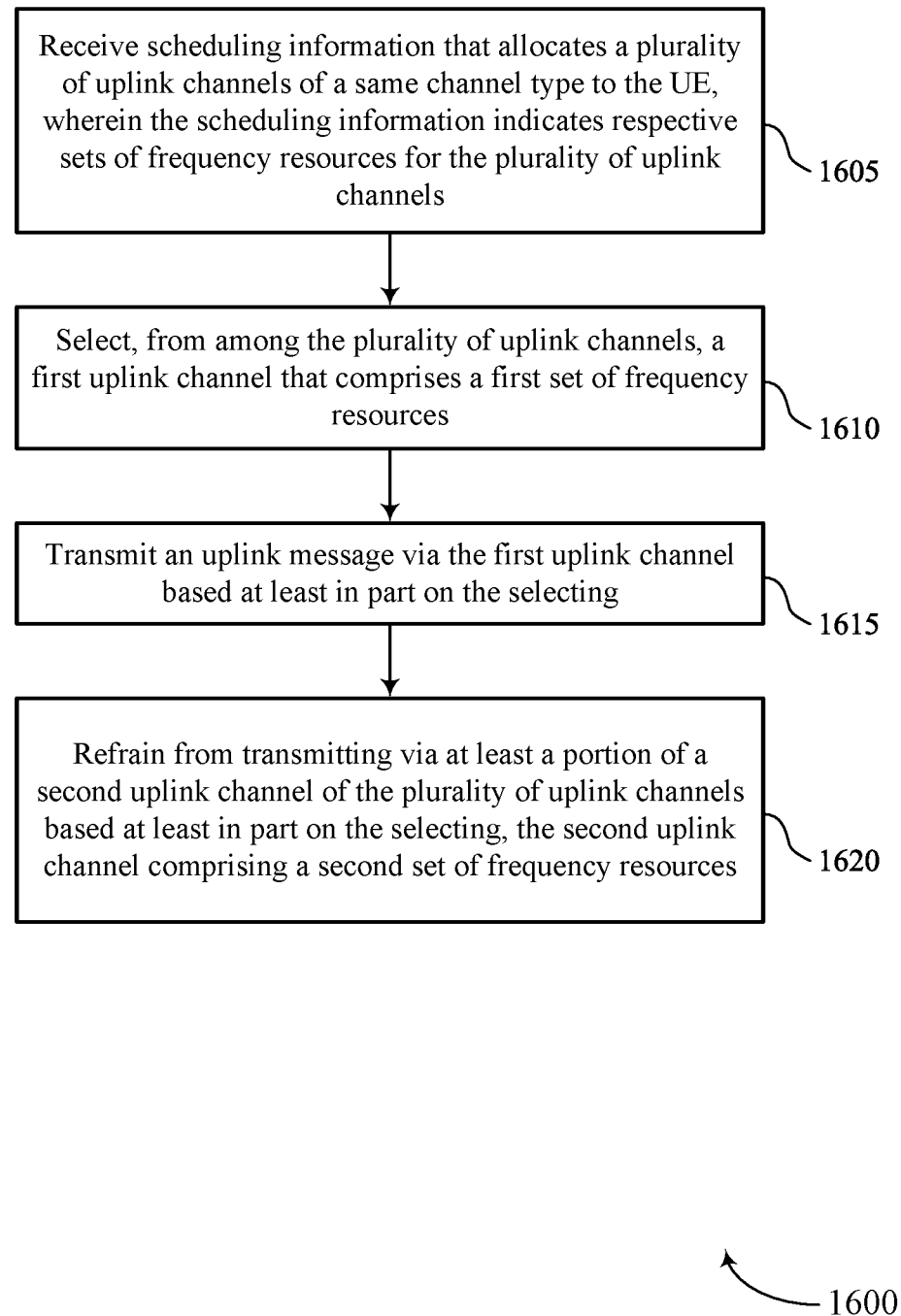
FIGS. 16 through 20 show flowcharts illustrating methods that support frequency resource selection for multiple channels in accordance with one or more aspects of the present disclosure.

FIG. 16 shows a flowchart illustrating a method 1600 that supports frequency resource selection for multiple channels in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving scheduling information that allocates a set of multiple uplink channels of a same channel type to the UE, where the scheduling information indicates respective sets of frequency resources for the set of multiple uplink channels. The operations of 1605 may be performed in accordance with examples as disclosed herein. In some examples, aspects of the operations of 1605 may be performed by a scheduling information component 1025 as described with reference to FIG. 10. Additionally, or alternatively, means for performing 1605 may, but not necessarily, include, for example, antenna 1125, transceiver 1115, communications manager 1120, memory 1130 (including code 1135), processor 1140 and/or bus 1145.

At 1610, the method may include selecting, from among the set of multiple uplink channels, a first uplink channel that includes a first set of frequency resources. The operations of 1610 may be performed in accordance with examples as disclosed herein. In some examples, aspects of the operations of 1610 may be performed by an uplink channel selection component 1030 as described with reference to FIG. 10. Additionally, or alternatively, means for performing 1610 may, but not necessarily, include, for example, antenna 1125, transceiver 1115, communications manager 1120, memory 1130 (including code 1135), processor 1140 and/or bus 1145.

At 1615, the method may include transmitting an uplink message via the first uplink channel based on the selecting. The operations of 1615 may be performed in accordance with examples as disclosed herein. In some examples, aspects of the operations of 1615 may be performed by an uplink message component 1035 as described with reference to FIG. 10. Additionally, or alternatively, means for performing 1615 may, but not necessarily, include, for example, antenna 1125, transceiver 1115, communications manager 1120, memory 1130 (including code 1135), processor 1140 and/or bus 1145.

At 1620, the method may include refraining from transmitting via at least a portion of a second uplink channel of the set of multiple uplink channels based on the selecting, the second uplink channel including a second set of frequency resources. The operations of 1620 may be performed in accordance with examples as disclosed herein. In some examples, aspects of the operations of 1620 may be performed by an uplink message component 1035 as described with reference to FIG. 10. Additionally, or alternatively, means for performing 1620 may, but not necessarily, include, for example, antenna 1125, transceiver 1115, communications manager 1120, memory 1130 (including code 1135), processor 1140 and/or bus 1145.

Figure 17:
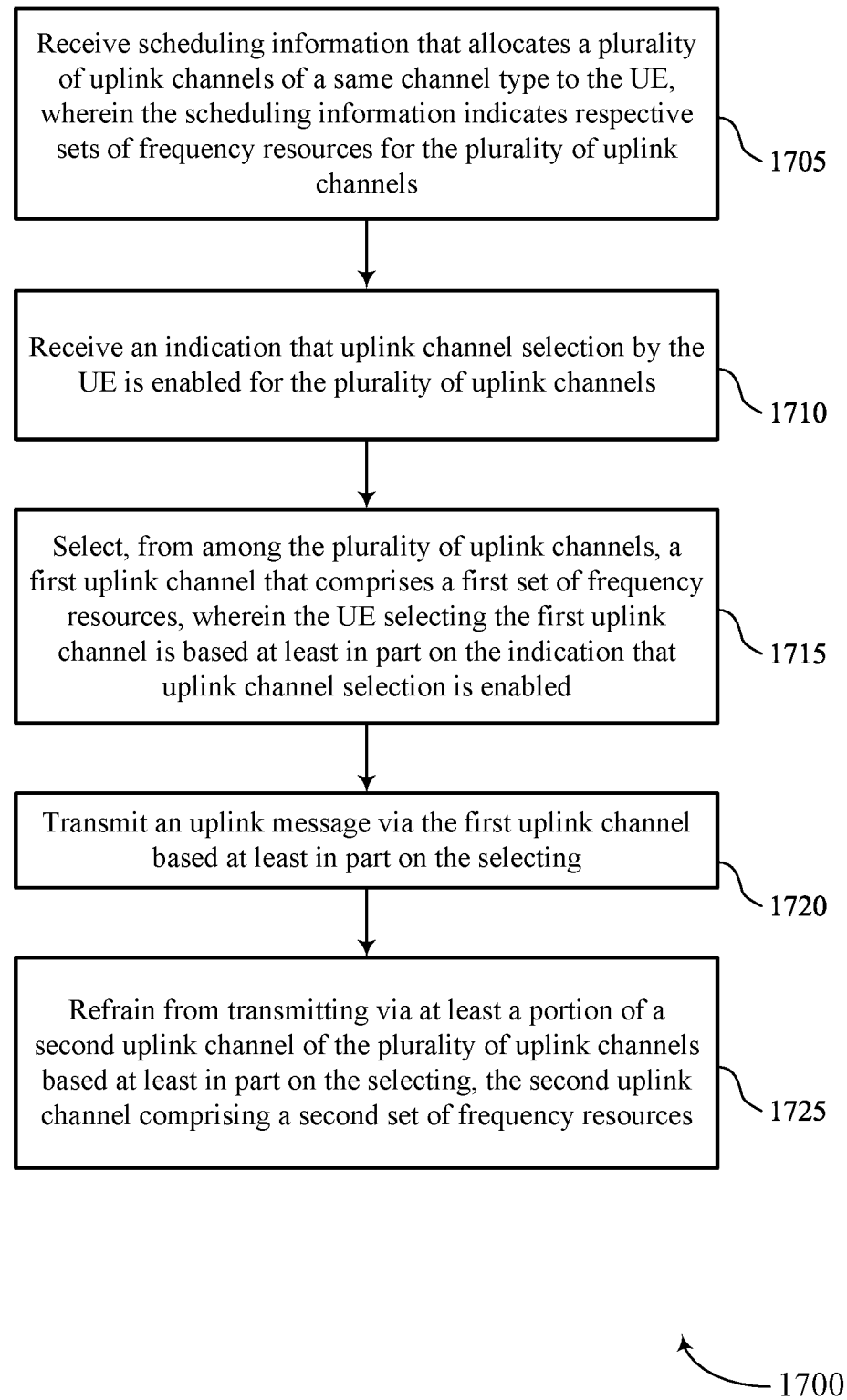

FIG. 17 shows a flowchart illustrating a method 1700 that supports frequency resource selection for multiple channels in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving scheduling information that allocates a set of multiple uplink channels of a same channel type to the UE, where the scheduling information indicates respective sets of frequency resources for the set of multiple uplink channels. The operations of 1705 may be performed in accordance with examples as disclosed herein. In some examples, aspects of the operations of 1705 may be performed by a scheduling information component 1025 as described with reference to FIG. 10. Additionally, or alternatively, means for performing 1705 may, but not necessarily, include, for example, antenna 1125, transceiver 1115, communications manager 1120, memory 1130 (including code 1135), processor 1140 and/or bus 1145.

At 1710, the method may include receiving an indication that uplink channel selection by the UE is enabled for the set of multiple uplink channels. The operations of 1710 may be performed in accordance with examples as disclosed herein. In some examples, aspects of the operations of 1710 may be performed by an uplink channel selection component 1030 as described with reference to FIG. 10. Additionally, or alternatively, means for performing 1710 may, but not necessarily, include, for example, antenna 1125, transceiver 1115, communications manager 1120, memory 1130 (including code 1135), processor 1140 and/or bus 1145.

At 1715, the method may include selecting, from among the set of multiple uplink channels, a first uplink channel that includes a first set of frequency resources. In some aspects, the UE selecting the first uplink channel may be based on the indication that uplink channel selection is enabled. The operations of 1715 may be performed in accordance with examples as disclosed herein. In some examples, aspects of the operations of 1715 may be performed by an uplink channel selection component 1030 as described with reference to FIG. 10. Additionally, or alternatively, means for performing 1715 may, but not necessarily, include, for example, antenna 1125, transceiver 1115, communications manager 1120, memory 1130 (including code 1135), processor 1140 and/or bus 1145.

At 1720, the method may include transmitting an uplink message via the first uplink channel based on the selecting. The operations of 1720 may be performed in accordance with examples as disclosed herein. In some examples, aspects of the operations of 1720 may be performed by an uplink message component 1035 as described with reference to FIG. 10. Additionally, or alternatively, means for performing 1720 may, but not necessarily, include, for example, antenna 1125, transceiver 1115, communications manager 1120, memory 1130 (including code 1135), processor 1140 and/or bus 1145.

At 1725, the method may include refraining from transmitting via at least a portion of a second uplink channel of the set of multiple uplink channels based on the selecting, the second uplink channel including a second set of frequency resources. The operations of 1725 may be performed in accordance with examples as disclosed herein. In some examples, aspects of the operations of 1725 may be performed by an uplink message component 1035 as described with reference to FIG. 10. Additionally, or alternatively, means for performing 1725 may, but not necessarily, include, for example, antenna 1125, transceiver 1115, communications manager 1120, memory 1130 (including code 1135), processor 1140 and/or bus 1145.

Figure 18:
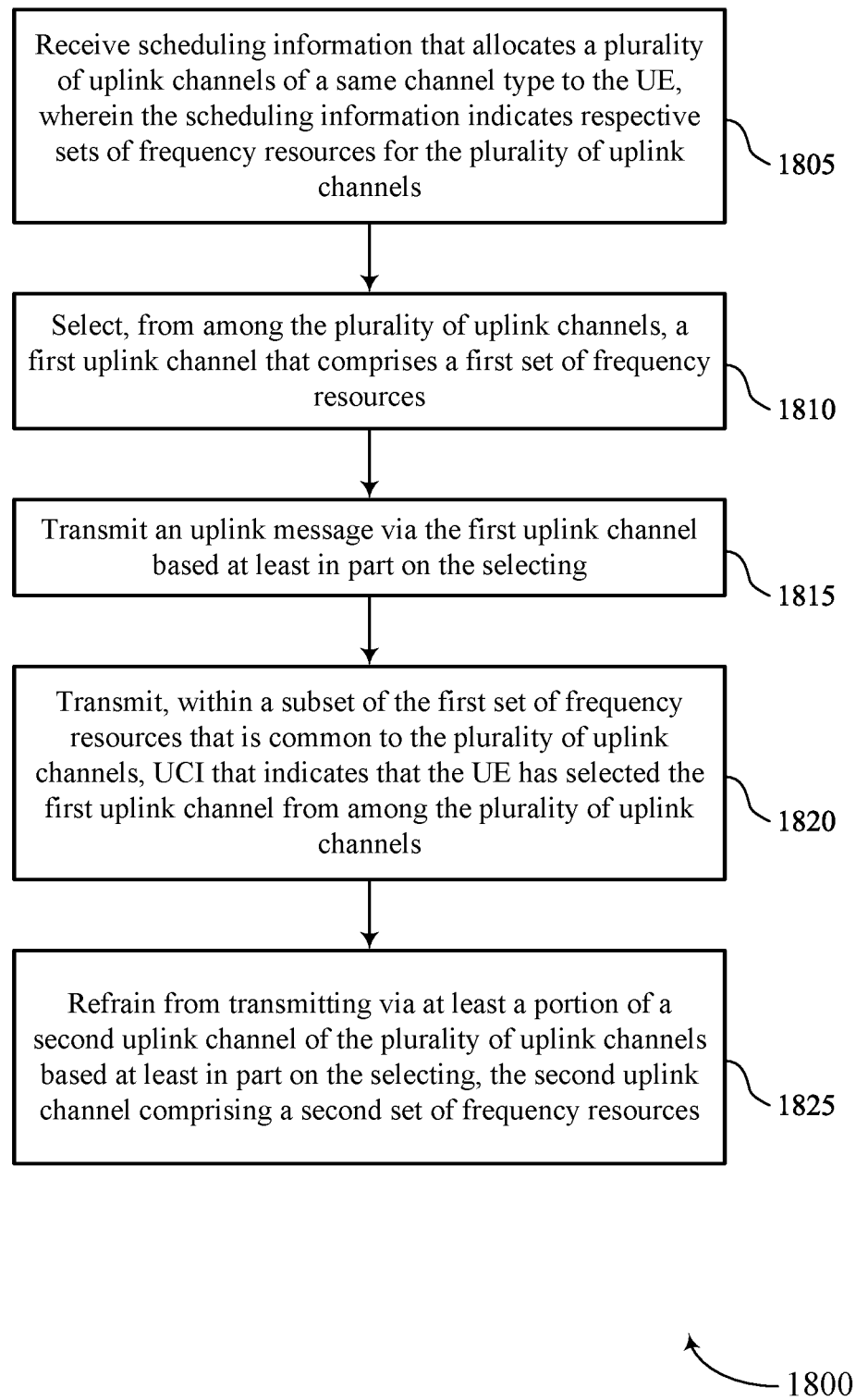

FIG. 18 shows a flowchart illustrating a method 1800 that supports frequency resource selection for multiple channels in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving scheduling information that allocates a set of multiple uplink channels of a same channel type to the UE, where the scheduling information indicates respective sets of frequency resources for the set of multiple uplink channels. The operations of 1805 may be performed in accordance with examples as disclosed herein. In some examples, aspects of the operations of 1805 may be performed by a scheduling information component 1025 as described with reference to FIG. 10. Additionally, or alternatively, means for performing 1805 may, but not necessarily, include, for example, antenna 1125, transceiver 1115, communications manager 1120, memory 1130 (including code 1135), processor 1140 and/or bus 1145.

At 1810, the method may include selecting, from among the set of multiple uplink channels, a first uplink channel that includes a first set of frequency resources. The operations of 1810 may be performed in accordance with examples as disclosed herein. In some examples, aspects of the operations of 1810 may be performed by an uplink channel selection component 1030 as described with reference to FIG. 10. Additionally, or alternatively, means for performing 1810 may, but not necessarily, include, for example, antenna 1125, transceiver 1115, communications manager 1120, memory 1130 (including code 1135), processor 1140 and/or bus 1145.

At 1815, the method may include transmitting an uplink message via the first uplink channel based on the selecting. The operations of 1815 may be performed in accordance with examples as disclosed herein. In some examples, aspects of the operations of 1815 may be performed by an uplink message component 1035 as described with reference to FIG. 10. Additionally, or alternatively, means for performing 1815 may, but not necessarily, include, for example, antenna 1125, transceiver 1115, communications manager 1120, memory 1130 (including code 1135), processor 1140 and/or bus 1145.

At 1820, the method may include transmitting, within a subset of the first set of frequency resources that is common to the set of multiple uplink channels, UCI that indicates that the UE has selected the first uplink channel from among the set of multiple uplink channels. The operations of 1820 may be performed in accordance with examples as disclosed herein. In some examples, aspects of the operations of 1820 may be performed by a UCI component 1040 as described with reference to FIG. 10. Additionally, or alternatively, means for performing 1820 may, but not necessarily, include, for example, antenna 1125, transceiver 1115, communications manager 1120, memory 1130 (including code 1135), processor 1140 and/or bus 1145.

At 1825, the method may include refraining from transmitting via at least a portion of a second uplink channel of the set of multiple uplink channels based on the selecting, the second uplink channel including a second set of frequency resources. The operations of 1825 may be performed in accordance with examples as disclosed herein. In some examples, aspects of the operations of 1825 may be performed by an uplink message component 1035 as described with reference to FIG. 10. Additionally, or alternatively, means for performing 1825 may, but not necessarily, include, for example, antenna 1125, transceiver 1115, communications manager 1120, memory 1130 (including code 1135), processor 1140 and/or bus 1145.

Figure 19:
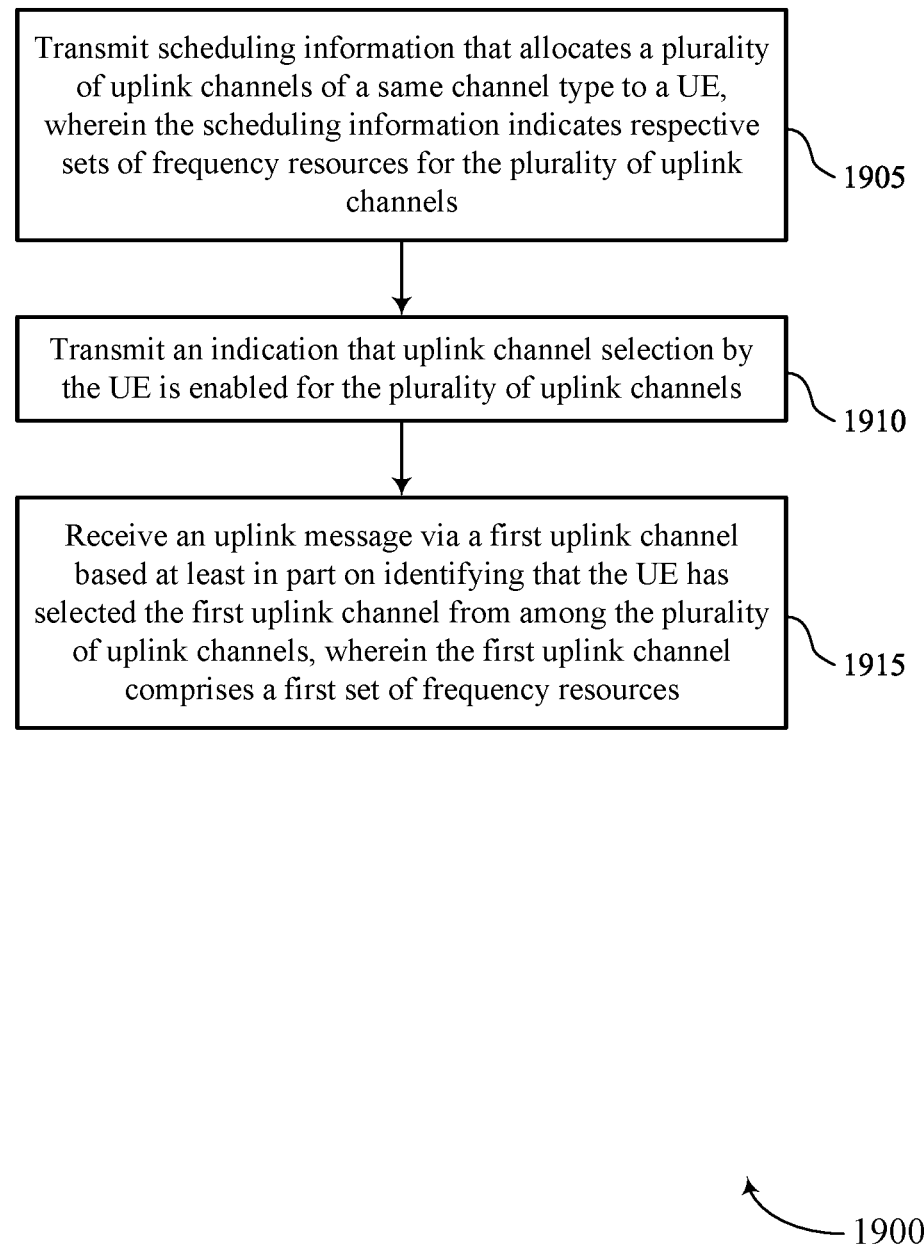

FIG. 19 shows a flowchart illustrating a method 1900 that supports frequency resource selection for multiple channels in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include transmitting scheduling information that allocates a set of multiple uplink channels of a same channel type to a UE, where the scheduling information indicates respective sets of frequency resources for the set of multiple uplink channels. The operations of 1905 may be performed in accordance with examples as disclosed herein. In some examples, aspects of the operations of 1905 may be performed by a scheduling information component 1425 as described with reference to FIG. 14. Additionally, or alternatively, means for performing 1905 may, but not necessarily, include, for example, antenna 1515, transceiver 1510, communications manager 1520, memory 1525 (including code 1530), processor 1535 and/or bus 1540.

At 1910, the method may include transmitting an indication that uplink channel selection by the UE is enabled for the set of multiple uplink channels. The operations of 1910 may be performed in accordance with examples as disclosed herein. In some examples, aspects of the operations of 1910 may be performed by an uplink channel selection component 1430 as described with reference to FIG. 14. Additionally, or alternatively, means for performing 1910 may, but not necessarily, include, for example, antenna 1515, transceiver 1510, communications manager 1520, memory 1525 (including code 1530), processor 1535 and/or bus 1540.

At 1915, the method may include receiving an uplink message via a first uplink channel based on identifying that the UE has selected the first uplink channel from among the set of multiple uplink channels, where the first uplink channel includes a first set of frequency resources. The operations of 1915 may be performed in accordance with examples as disclosed herein. In some examples, aspects of the operations of 1915 may be performed by an uplink message component 1435 as described with reference to FIG. 14. Additionally, or alternatively, means for performing 1915 may, but not necessarily, include, for example, antenna 1515, transceiver 1510, communications manager 1520, memory 1525 (including code 1530), processor 1535 and/or bus 1540.

Figure 20:
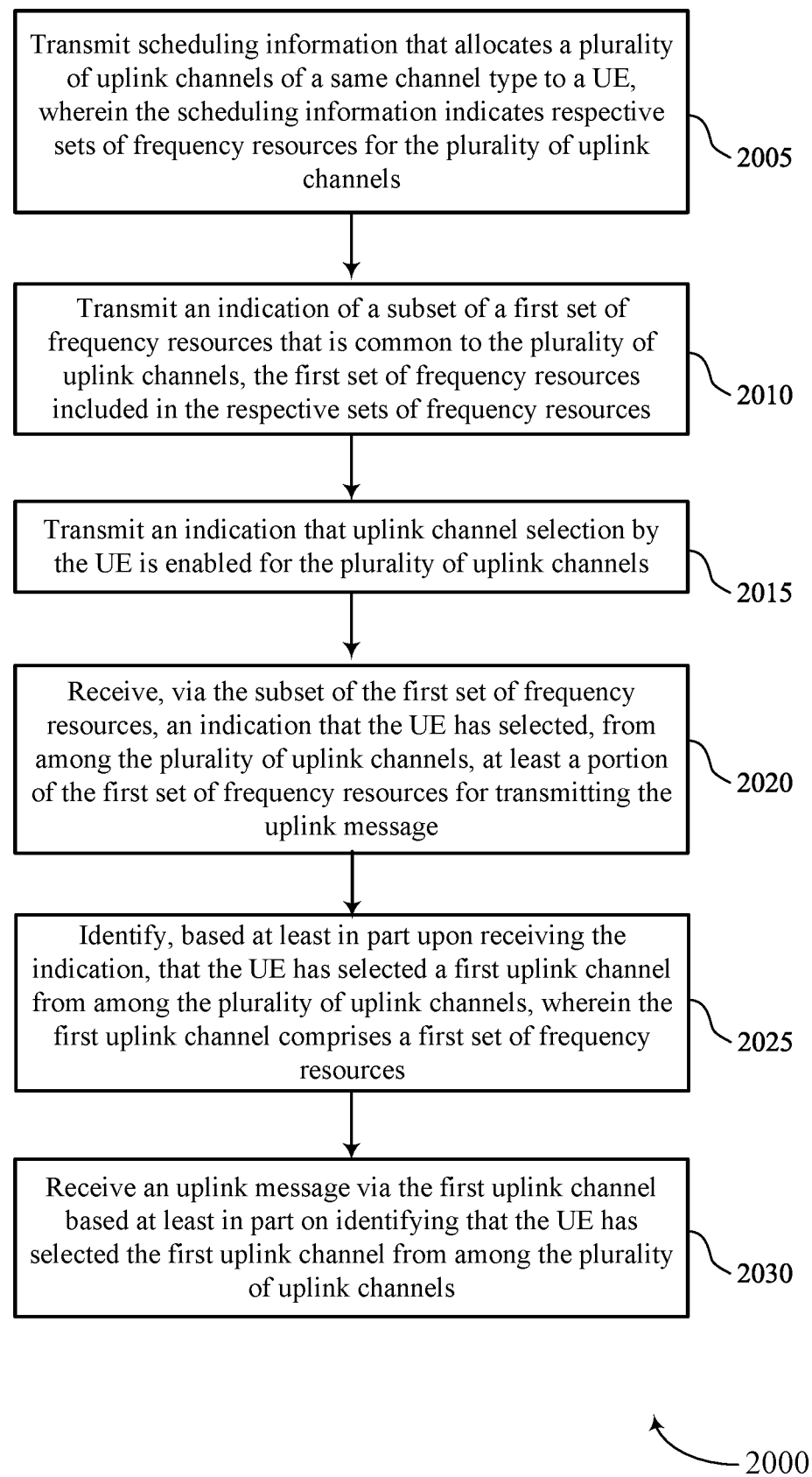

FIG. 20 shows a flowchart illustrating a method 2000 that supports frequency resource selection for multiple channels in accordance with one or more aspects of the present disclosure. The operations of the method 2000 may be implemented by a network entity or its components as described herein. For example, the operations of the method 2000 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2005, the method may include transmitting scheduling information that allocates a plurality of uplink channels of a same channel type to a UE, wherein the scheduling information indicates respective sets of frequency resources for the plurality of uplink channels. The operations of 2005 may be performed in accordance with examples as disclosed herein. In some examples, aspects of the operations of 2005 may be performed by a scheduling information component 1425 as described with reference to FIG. 14. Additionally, or alternatively, means for performing 2005 may, but not necessarily, include, for example, antenna 1515, transceiver 1510, communications manager 1520, memory 1525 (including code 1530), processor 1535 and/or bus 1540.

At 2010, the method may include transmitting an indication of a subset of a first set of frequency resources that is common to the plurality of uplink channels, the first set of frequency resources included in the respective sets of frequency resources. The operations of 2010 may be performed in accordance with examples as disclosed herein. In some examples, aspects of the operations of 2010 may be performed by a reserved resource component 1440 as described with reference to FIG. 14. Additionally, or alternatively, means for performing 2010 may, but not necessarily, include, for example, antenna 1515, transceiver 1510, communications manager 1520, memory 1525 (including code 1530), processor 1535 and/or bus 1540.

At 2015, the method may include transmitting an indication that uplink channel selection by the UE is enabled for the plurality of uplink channels. The operations of 2015 may be performed in accordance with examples as disclosed herein. In some examples, aspects of the operations of 2015 may be performed by an uplink channel selection component 1430 as described with reference to FIG. 14. Additionally, or alternatively, means for performing 2015 may, but not necessarily, include, for example, antenna 1515, transceiver 1510, communications manager 1520, memory 1525 (including code 1530), processor 1535 and/or bus 1540.

At 2020, the method may include receiving, via the subset of the first set of frequency resources, an indication that the UE has selected, from among the plurality of uplink channels, at least a portion of the first set of frequency resources for transmitting the uplink message. The operations of 2020 may be performed in accordance with examples as disclosed herein. In some examples, aspects of the operations of 2020 may be performed by an uplink channel selection component 1430 as described with reference to FIG. 14. Additionally, or alternatively, means for performing 2020 may, but not necessarily, include, for example, antenna 1515, transceiver 1510, communications manager 1520, memory 1525 (including code 1530), processor 1535 and/or bus 1540.

At 2025, the method may include identifying, based on receiving the indication, that the UE has selected a first uplink channel from among the plurality of uplink channels, wherein the first uplink channel comprises a first set of frequency resources. The operations of 2025 may be performed in accordance with examples as disclosed herein. In some examples, aspects of the operations of 2025 may be performed by an uplink channel selection component 1430 as described with reference to FIG. 14. Additionally, or alternatively, means for performing 2025 may, but not necessarily, include, for example, antenna 1515, transceiver 1510, communications manager 1520, memory 1525 (including code 1530), processor 1535 and/or bus 1540.

At 2030, the method may include receiving an uplink message via the first uplink channel based at least in part on identifying that the UE has selected the first uplink channel from among the plurality of uplink channels. The operations of 2030 may be performed in accordance with examples as disclosed herein. In some examples, aspects of the operations of 2030 may be performed by an uplink channel selection component 1430 as described with reference to FIG. 14. Additionally, or alternatively, means for performing 2030 may, but not necessarily, include, for example, antenna 1515, transceiver 1510, communications manager 1520, memory 1525 (including code 1530), processor 1535 and/or bus 1540.

The following provides an overview of aspects of the present disclosure:

Aspect 1: A method for wireless communication at a UE, comprising: receiving scheduling information that allocates a plurality of uplink channels of a same channel type to the UE, wherein the scheduling information indicates respective sets of frequency resources for the plurality of uplink channels; selecting, from among the plurality of uplink channels, a first uplink channel that comprises a first set of frequency resources; transmitting an uplink message via the first uplink channel based at least in part on the selecting; and refraining from transmitting via at least a portion of a second uplink channel of the plurality of uplink channels based at least in part on the selecting, the second uplink channel comprising a second set of frequency resources.

Aspect 2: The method of aspect 1, wherein receiving the scheduling information comprises: receiving, via the scheduling information, an indication that uplink channel selection by the UE is enabled for the plurality of uplink channels, wherein the UE selecting the first uplink channel is based at least in part on the indication that uplink channel selection is enabled.

Aspect 3: The method of aspect 2, wherein: the scheduling information comprises a DCI message; and the indication that uplink channel selection by the UE is enabled for the plurality of uplink channels comprises a format of the DCI message.

Aspect 4: The method of any of aspects 1 through 3, wherein the plurality of uplink channels are at least partially overlapping in a frequency domain, the method further comprising: transmitting, within a subset of the first set of frequency resources that is common to the plurality of uplink channels, UCI that indicates that the UE has selected the first uplink channel from among the plurality of uplink channels.

Aspect 5: The method of aspect 4, further comprising: selecting a second subset of the first set of frequency resources for transmitting the uplink message, wherein the uplink message is transmitted within the second subset of the first set of frequency resources, and wherein the UCI further indicates that the UE has selected the second subset for transmitting the uplink message.

Aspect 6: The method of any of aspects 4 through 5, further comprising: receiving, via the scheduling information or a control message that is different than the scheduling information, an indication of the subset of the first set of frequency resources that is common to the plurality of uplink channels.

Aspect 7: The method of any of aspects 1 through 3, wherein the plurality of uplink channels are at least partially overlapping in a frequency domain, the method further comprising: transmitting, via a subset of the first set of frequency resources, a DMRS sequence that indicates that the UE has selected the first uplink channel from among the plurality of uplink channels, wherein the subset of the first set of frequency resources is common to the plurality of uplink channels.

Aspect 8: The method of any of aspects 1 through 3, wherein each of the plurality of uplink channels comprises a respective set of reserved resources for UCI, the method further comprising: transmitting, via the respective set of reserved resources within the first uplink channel, UCI that indicates that the UE has selected the first uplink channel from among the plurality of uplink channels.

Aspect 9: The method of any of aspects 1 through 3, wherein each of the plurality of uplink channels is associated with a respective DMRS sequence, the method further comprising: transmitting, via a portion of the first uplink channel, the respective DMRS sequence for the first uplink channel to indicate that the UE has selected the first uplink channel from among the plurality of uplink channels.

Aspect 10: The method of any of aspects 1 through 9, wherein receiving the scheduling information comprises: receiving, within the scheduling information, a plurality of FDRA fields that each allocate a respective uplink channel of the plurality of uplink channels.

Aspect 11: The method of any of aspects 1 through 9, further comprising: receiving a control message that indicates a plurality of sets of frequency resources, wherein an FDRA field within the scheduling information indicates a subset of the plurality of sets of frequency resources, the subset comprising the respective sets of frequency resources for the plurality of uplink channels.

Aspect 12: The method of any of aspects 1 through 11, wherein receiving the scheduling information comprises: receiving a DCI message that allocates the plurality of uplink channels to the UE and indicates the respective sets of frequency resources for the plurality of uplink channels.

Aspect 13: The method of any of aspects 1 through 11, wherein receiving the scheduling information comprises: receiving at least one configured grant that allocates the plurality of uplink channels to the UE and indicates the respective sets of frequency resources for the plurality of uplink channels.

Aspect 14: The method of any of aspects 1 through 13, wherein: the plurality of uplink channels allocated to the UE are overlapping in a time domain; and the plurality of uplink channels allocated to the UE are partially overlapping or non-overlapping in a frequency domain.

Aspect 15: A method for wireless communication at a network entity, comprising: transmitting scheduling information that allocates a plurality of uplink channels of a same channel type to a UE, wherein the scheduling information indicates respective sets of frequency resources for the plurality of uplink channels; transmitting an indication that uplink channel selection by the UE is enabled for the plurality of uplink channels; and receiving an uplink message via a first uplink channel based at least in part on identifying that the UE has selected the first uplink channel from among the plurality of uplink channels, wherein the first uplink channel comprises a first set of frequency resources.

Aspect 16: The method of aspect 15, wherein transmitting the scheduling information comprises: transmitting, within the scheduling information, the indication that uplink channel selection by the UE is enabled for the plurality of uplink channels.

Aspect 17: The method of any of aspects 15 through 16, wherein the plurality of uplink channels are at least partially overlapping in a frequency domain, the method further comprising: transmitting, via the scheduling information or a control message that is different than the scheduling information, an indication of a subset of the first set of frequency resources that is common to the plurality of uplink channels; and receiving, via the subset of the first set of frequency resources, an indication that the UE has selected, from among the plurality of uplink channels, at least a portion of the first set of frequency resources in the first uplink channel for transmitting the uplink message, wherein identifying that the UE has selected the first uplink channel is based on receiving the indication.

Aspect 18: The method of any of aspects 15 through 16, wherein each of the plurality of uplink channels comprises a respective set of reserved resources for UCI, the method further comprising: receiving, via the respective set of reserved resources within the first uplink channel, UCI that indicates that the UE selected the first uplink channel from among the plurality of uplink channels, wherein identifying that the UE has selected the first uplink channel is based on receiving the indication.

Aspect 19: The method of any of aspects 15 through 16, wherein each of the plurality of uplink channels is associated with a respective DMRS sequence, the method further comprising: receiving, via a portion of the first uplink channel, the respective DMRS sequence for the first uplink channel, wherein identifying that the UE selected the first uplink channel is based at least in part on receiving the respective DMRS sequence for the first uplink channel.

Aspect 20: The method of any of aspects 15 through 19, wherein transmitting the scheduling information comprises: transmitting, within the scheduling information, a plurality of FDRA fields that each allocate a respective uplink channel of the plurality of uplink channels.

Aspect 21: The method of any of aspects 15 through 19, further comprising: transmitting a control message that indicates a plurality of sets of frequency resources, wherein a FDRA field within the scheduling information indicates a subset of the plurality of sets of frequency resources, the subset comprising the respective sets of frequency resources for the plurality of uplink channels.

Aspect 22: The method of any of aspects 15 through 21, wherein transmitting the scheduling information comprises: transmitting a DCI message or at least one configured grant that allocates the plurality of uplink channels to the UE and indicates the respective sets of frequency resources for the plurality of uplink channels.

Aspect 23: The method of any of aspects 15 through 22, wherein no signaling is received from the UE within at least a portion of a second uplink channel of the plurality of uplink channels, the second uplink channel comprising a second set of frequency resources set.

Aspect 24: The method of any of aspects 15 through 23, wherein: the plurality of uplink channels allocated to the UE are overlapping in a time domain; and the plurality of uplink channels allocated to the UE are partially overlapping or non-overlapping in a frequency domain.

Aspect 25: An apparatus for wireless communication, comprising a memory, transceiver, and at least one processor coupled with the memory and the transceiver, the at least one processor configured to perform a method of any of aspects 1 through 14.

Aspect 26: An apparatus for wireless communication at a UE, comprising at least one means for performing a method of any of aspects 1 through 14.

Aspect 27: A non-transitory computer-readable medium storing code for wireless communication at a UE, the code comprising instructions executable by a processor to perform a method of any of aspects 1 through 14.

Aspect 28: An apparatus for wireless communication, comprising a memory and at least one processor coupled with the memory, the at least one processor configured to perform a method of any of aspects 15 through 24.

Aspect 29: An apparatus for wireless communication at a network entity, comprising at least one means for performing a method of any of aspects 15 through 24.

Aspect 30: A non-transitory computer-readable medium storing code for wireless communication at a network entity, the code comprising instructions executable by a processor to perform a method of any of aspects 15 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving scheduling information that allocates a plurality of uplink channels of a same channel type to the UE, wherein the scheduling information indicates respective sets of frequency resources for the plurality of uplink channels;
   selecting, by the UE and from among the plurality of uplink channels, a first uplink channel that comprises a first set of frequency resources;
   transmitting an uplink message via the first uplink channel based at least in part on the selecting; and
   refraining from transmitting via a first portion of a second uplink channel of the plurality of uplink channels based at least in part on the selecting of the first uplink channel, the second uplink channel comprising a second set of frequency resources, wherein the first portion of the second uplink channel is overlapping with the first set of frequency resources of the first uplink channel in a frequency domain, and wherein a second portion of the second uplink channel comprises second frequency resources within the second set of frequency resources that are non-overlapping with the first set of frequency resources of the first uplink channel in the frequency domain.

2. The method of claim 1, wherein receiving the scheduling information comprises:
   receiving, via the scheduling information, an indication that uplink channel selection by the UE is enabled for the plurality of uplink channels, wherein the UE selecting the first uplink channel is based at least in part on the indication that uplink channel selection is enabled.

3. The method of claim 2, wherein:
   the scheduling information comprises a downlink control information message; and
   the indication that uplink channel selection by the UE is enabled for the plurality of uplink channels comprises a format of the downlink control information message.

4. The method of claim 1, wherein the plurality of uplink channels are at least partially overlapping in the frequency domain, the method further comprising:
   transmitting, within a subset of the first set of frequency resources that is common to the plurality of uplink channels, uplink control information that indicates that the UE has selected the first uplink channel from among the plurality of uplink channels.

5. The method of claim 4, further comprising:
selecting a second subset of the first set of frequency resources for transmitting the uplink message, wherein the uplink message is transmitted within the second subset of the first set of frequency resources, and wherein the uplink control information further indicates that the UE has selected the second subset for transmitting the uplink message.

6. The method of claim 4, further comprising:
receiving, via the scheduling information or a control message that is different than the scheduling information, an indication of the subset of the first set of frequency resources that is common to the plurality of uplink channels.

7. The method of claim 1, wherein the plurality of uplink channels are at least partially overlapping in the frequency domain, the method further comprising:
transmitting, via a subset of the first set of frequency resources, a demodulation reference signal sequence that indicates that the UE has selected the first uplink channel from among the plurality of uplink channels, wherein the subset of the first set of frequency resources is common to the plurality of uplink channels.

8. The method of claim 1, wherein each of the plurality of uplink channels comprises a respective set of reserved resources for uplink control information, the method further comprising:
transmitting, via the respective set of reserved resources within the first uplink channel, first uplink control information that indicates that the UE has selected the first uplink channel from among the plurality of uplink channels.

9. The method of claim 1, wherein each of the plurality of uplink channels is associated with a respective demodulation reference signal sequence, the method further comprising:
transmitting, via a portion of the first uplink channel, the respective demodulation reference signal sequence for the first uplink channel to indicate that the UE has selected the first uplink channel from among the plurality of uplink channels.

10. The method of claim 1, wherein receiving the scheduling information comprises:
receiving, within the scheduling information, a plurality of frequency domain resource allocation fields that each allocate a respective uplink channel of the plurality of uplink channels.

11. The method of claim 1, further comprising:
receiving a control message that indicates a plurality of sets of frequency resources, wherein a frequency domain resource allocation field within the scheduling information indicates a subset of the plurality of sets of frequency resources, the subset comprising the respective sets of frequency resources for the plurality of uplink channels.

12. The method of claim 1, wherein receiving the scheduling information comprises:
receiving a downlink control information message that allocates the plurality of uplink channels to the UE and indicates the respective sets of frequency resources for the plurality of uplink channels.

13. The method of claim 1, wherein receiving the scheduling information comprises:
receiving at least one configured grant that allocates the plurality of uplink channels to the UE and indicates the respective sets of frequency resources for the plurality of uplink channels.

14. The method of claim 1, wherein:
the plurality of uplink channels allocated to the UE are overlapping in a time domain.

15. A method for wireless communication at a network entity, comprising:
transmitting scheduling information that allocates a plurality of uplink channels of a same channel type to a user equipment (UE), wherein the scheduling information indicates respective sets of frequency resources for the plurality of uplink channels;
transmitting an indication that uplink channel selection by the UE is enabled for the plurality of uplink channels comprising the respective sets of frequency resources; and
receiving an uplink message via a first uplink channel based at least in part on identifying that the UE has selected the first uplink channel from among the plurality of uplink channels in accordance with the indication that uplink channel selection by the UE is enabled, wherein the first uplink channel comprises a first set of frequency resources.

16. The method of claim 15, wherein the plurality of uplink channels are at least partially overlapping in a frequency domain, the method further comprising:
transmitting, via the scheduling information or a control message that is different than the scheduling information, an indication of a subset of the first set of frequency resources that is common to the plurality of uplink channels; and
receiving, via the subset of the first set of frequency resources, an indication that the UE has selected, from among the plurality of uplink channels, at least a portion of the first set of frequency resources in the first uplink channel for transmitting the uplink message, wherein identifying that the UE has selected the first uplink channel is based at least in part on receiving the indication.

17. The method of claim 15, wherein each of the plurality of uplink channels comprises a respective set of reserved resources for uplink control information, the method further comprising:
receiving, via the respective set of reserved resources within the first uplink channel, first uplink control information that indicates that the UE selected the first uplink channel from among the plurality of uplink channels, wherein identifying that the UE has selected the first uplink channel is based at least in part on receiving the indication.

18. The method of claim 15, wherein each of the plurality of uplink channels is associated with a respective demodulation reference signal sequence, the method further comprising:
receiving, via a portion of the first uplink channel, the respective demodulation reference signal sequence for the first uplink channel, wherein identifying that the UE selected the first uplink channel is based at least in part on receiving the respective demodulation reference signal sequence for the first uplink channel.

19. The method of claim 15, wherein transmitting the scheduling information comprises:

transmitting, within the scheduling information, a plurality of frequency domain resource allocation fields that each allocate a respective uplink channel of the plurality of uplink channels.

20. The method of claim 15, further comprising:
transmitting a control message that indicates a plurality of sets of frequency resources, wherein a frequency domain resource allocation field within the scheduling information indicates a subset of the plurality of sets of frequency resources, the subset comprising the respective sets of frequency resources for the plurality of uplink channels.

21. The method of claim 15, wherein transmitting the scheduling information comprises:
transmitting a downlink control information message or at least one configured grant that allocates the plurality of uplink channels to the UE and indicates the respective sets of frequency resources for the plurality of uplink channels.

22. The method of claim 15, wherein no signaling is received from the UE within at least a portion of a second uplink channel of the plurality of uplink channels, the second uplink channel comprising a second set of frequency resources set.

23. The method of claim 15, wherein:
the plurality of uplink channels allocated to the UE are overlapping in a time domain; and
the plurality of uplink channels allocated to the UE are partially overlapping or non-overlapping in a frequency domain.

24. An apparatus for wireless communication, comprising:
memory;
a transceiver; and
at least one processor of a user equipment (UE), the at least one processor coupled with the memory and the transceiver, and the at least one processor configured to:
receive, via the transceiver, scheduling information that allocates a plurality of uplink channels of a same channel type to the UE, wherein the scheduling information indicates respective sets of frequency resources for the plurality of uplink channels;
select, by the UE and from among the plurality of uplink channels, a first uplink channel that comprises a first set of frequency resources;
transmit, via the transceiver, an uplink message via the first uplink channel based at least in part on the selecting; and
refrain from transmitting via a first portion of a second uplink channel of the plurality of uplink channels based at least in part on the selecting of the first uplink channel, the second uplink channel comprising a second set of frequency resources, wherein the first portion of the second uplink channel is overlapping with the first set of frequency resources of the first uplink channel in a frequency domain, and wherein a second portion of the second uplink channel comprises second frequency resources within the second set of frequency resources that are non-overlapping with the first set of frequency resources of the first uplink channel in the frequency domain.

25. The apparatus of claim 24, the at least one processor further configured to:
receive, via the transceiver and within the scheduling information, an indication that uplink shared channel selection by the UE is enabled for the plurality of uplink channels, wherein the UE selecting the first uplink channel is based at least in part on the indication that uplink shared channel selection is enabled.

26. The apparatus of claim 24, wherein the plurality of uplink channels are at least partially overlapping in the frequency domain, the at least one processor further configured to:
transmit, via the transceiver and within a subset of the first set of frequency resources that is common to the plurality of uplink channels, uplink control information that indicates that the UE has selected the first uplink channel from among the plurality of uplink channels.

27. An apparatus for wireless communication, comprising:
memory; and
at least one processor of a network entity, the at least one processor coupled with the memory, and the at least one processor configured to:
transmit scheduling information that allocates a plurality of uplink channels of a same channel type to a user equipment (UE), wherein the scheduling information indicates respective sets of frequency resources for the plurality of uplink channels;
transmit an indication that uplink shared channel selection by the UE is enabled for the plurality of uplink channels comprising the respective sets of frequency resources; and
receive an uplink message via a first uplink channel based at least in part on identifying that the UE has selected the first uplink channel from among the plurality of uplink channels in accordance with the indication that uplink channel selection by the UE is enabled, wherein the first uplink channel comprises a first set of frequency resources.

28. The apparatus of claim 27, wherein, to transmit the scheduling information, the at least one processor is configured to:
transmit, within the scheduling information, the indication that uplink shared channel selection by the UE is enabled for the plurality of uplink channels.

29. The apparatus of claim 27, wherein the plurality of uplink channels are at least partially overlapping in a frequency domain, the at least one processor further configured to:
transmit, via the scheduling information or a control message that is different than the scheduling information, an indication of a subset of the first set of frequency resources that is common to the plurality of uplink channels; and
receive, via the subset of the first set of frequency resources, an indication that the UE has selected, from among the plurality of uplink channels, at least a portion of the first set of frequency resources in the first uplink channel for transmitting the uplink message, wherein identifying that the UE has selected the first uplink channel is based at least in part on receiving the indication.

* * * * *